US009443438B1

(12) United States Patent
Shapiro et al.

(10) Patent No.: US 9,443,438 B1
(45) Date of Patent: Sep. 13, 2016

(54) TAXI CLEARANCE ELECTRONIC RECORDING DISPLAY UNIT AND METHOD

(71) Applicants: Geoffrey A. Shapiro, Cedar Rapids, IA (US); Matthew J. Carrico, Mt. Vernon, IA (US)

(72) Inventors: Geoffrey A. Shapiro, Cedar Rapids, IA (US); Matthew J. Carrico, Mt. Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 32 days.

(21) Appl. No.: 14/880,568

(22) Filed: Oct. 12, 2015

Related U.S. Application Data

(62) Division of application No. 13/245,898, filed on Sep. 27, 2011, now Pat. No. 9,202,380.

(51) Int. Cl.
*G06F 19/00* (2011.01)
*G08G 5/06* (2006.01)
*G08G 5/00* (2006.01)
*G06T 11/60* (2006.01)

(52) U.S. Cl.
CPC ............... *G08G 5/065* (2013.01); *G06T 11/60* (2013.01); *G08G 5/0026* (2013.01); *G08G 5/0082* (2013.01)

(58) Field of Classification Search
CPC ............. G08G 5/0013; G08G 5/0043; G08G 5/0082; G08G 5/0026; G08G 5/065
USPC .......................................................... 701/20
See application file for complete search history.

(56) References Cited

U.S. PATENT DOCUMENTS

| 6,658,572 | B1* | 12/2003 | Craig | B64D 45/0015 726/16 |
|---|---|---|---|---|
| 7,343,229 | B1* | 3/2008 | Wilson | G08G 5/0021 340/951 |
| 7,555,372 | B2* | 6/2009 | Dwyer | G01C 23/005 340/969 |
| 7,567,187 | B2* | 7/2009 | Ramaiah | G01C 21/00 340/945 |
| 7,974,773 | B1* | 7/2011 | Krenz | G01C 23/00 340/945 |
| 8,024,078 | B2* | 9/2011 | Coulmeau | G08G 5/0013 244/75.1 |
| 2003/0083804 | A1* | 5/2003 | Pilley | G01C 23/00 701/120 |
| 2004/0006412 | A1* | 1/2004 | Doose | G01C 21/26 701/10 |
| 2007/0168111 | A1* | 7/2007 | Dubourg | G01C 23/00 701/120 |
| 2007/0241936 | A1* | 10/2007 | Arthur | G01C 23/00 340/958 |
| 2010/0114922 | A1* | 5/2010 | Gayraud | G08G 5/065 707/758 |
| 2011/0196598 | A1* | 8/2011 | Feyereisen | G01C 21/00 701/120 |
| 2011/0196599 | A1* | 8/2011 | Feyereisen | G01C 21/00 701/120 |

* cited by examiner

*Primary Examiner* — Ian Jen
(74) *Attorney, Agent, or Firm* — Daniel M. Barbieri; Donna P. Suchy; Angel N. Gerdzhikov

(57) ABSTRACT

Present novel and non-trivial methods for electronically recording a taxi clearance on a display unit are disclosed. In one method, an interactive surface map is displayed from which selections of an assigned takeoff runway and taxiway(s) stated in a taxi clearance may be made electronically through advanced gesturing techniques. These selections highlight the surfaces stated in the taxi clearance. The selections may be made through a series of touch screen taps and/or by the grabbing, dragging, and releasing of a "rubber band" which snaps into place over the selected surface. In another method, an auto-route generating algorithm may be employed to create a preliminary taxi clearance after a presumed runway for takeoff has been selected by the pilot. Then, as the taxi clearance is being received, changes may be made through the pilot's interaction with the graphical user interfaces commensurate with the actual taxi clearance.

20 Claims, 15 Drawing Sheets

TAXI CLEARANCE ELECTRONIC RECORDING DISPLAY UNIT AND METHOD

CROSS-REFERENCE TO RELATED APPLICATIONS

This application in a divisional and claims the benefit of U.S. Non-Provisional application Ser. No. 13/245,898 filed on Sep. 27, 2011 and entitled "System and Method for Electronically Recording a Taxi Clearance on an Aircraft Display Unit" which is incorporated by reference.

BACKGROUND OF THE INVENTION

1. Field of the Invention

This invention pertains generally to the field of aircraft display units that present information to the pilot or flight crew of an aircraft on the surface of an airport.

2. Description of the Related Art

With a desire to reduce aircraft weight and with the proliferation of portable, lightweight electronic devices (e.g., notebooks, flight bags, and tablets), paper documents (e.g., checklists, charts, amps, etc. . . . ) are being used less by pilots of aircraft. With respect to maps, electronic moving maps such as an airport surface moving map ("ASMM") are becoming ubiquitous throughout the aviation industry. Examples of aircraft providing ASMMs include the Boeing 787, the Airbus 380, and many business and regional jets. These maps are intended to increase surface situational awareness by displaying the airport map with ownship position and/or surface traffic overlay of other traffic.

Taxi clearances contain taxi instructions to pilots, and they are often provides via two-way radio communications between a pilot and a person authorized to issued the taxi clearance (e.g., an air traffic/ground controller). Taxi clearances may be communicated to the pilot using VHF radio. The pilot will hear the taxi clearance and record it as it is being heard. As the pilot hears the clearance, he or she may record or transcribe the clearance by writing it down on a piece of paper, notating the route on a paper chart, etc. . . . If the clearance is written down, the pilot may have to constantly shift his or her attention between the words of the clearance and a map of an airport to understand the route stated in the clearance. If the pilot records the clearance on a paper chart, mistakes made in the initial transcription may result with the erasing or crossing out of erroneous entries, which could confuse the pilot when he or she makes subsequent reference to it during the taxi.

BRIEF SUMMARY OF THE INVENTION

The embodiments disclosed herein present at least one novel and non-trivial method for electronically recording a taxi clearance on an interactive airport surface map that is presented on a display unit. The electronically recording of the taxi clearance in graphical and/or textual form could ease the ability with which the pilot's receives and records the taxi clearance.

In one embodiment, a first method is disclosed for electronically recording a taxi clearance on a display unit, where such method may be performed by a taxi path generator ("TPG"). Initially, pixel image data representative of an airport surface map may be established and displayed on a display unit such as portable, touch screen device. After the map is displayed, the TPG may receive first entry data corresponding to an assigned runway for takeoff from a pilot input device (which could also be the same device as the display unit). In response, the pixel image data could be updated with first pixel data representative of a runway highlighter to highlight the assigned runway on the map. Then, the TPG may receive second entry data corresponding to one or more assigned taxiways specified in the taxi clearance. In response, the pixel image data could be updated with second pixel data representative of one or more taxiway highlighters to highlight each taxiway on the map. Then, the TPG may update the pixel image data with third pixel data representative of one or more cross/hold short indicators for each taxiway/runway intersection encountered in the taxi clearance. The third pixel data could be updated automatically or in response to input received through the pilot input device. In addition to runway and taxiway highlighters, text may also be presented as input is received.

In another embodiment, a second method is disclosed for electronically recording a taxi clearance on the display unit. After pixel image data representative of a map of airport surfaces has been established and displayed on the display unit, the TPG may receive navigation data representative of ownship position and first entry data through the pilot input device corresponding to a presumed runway for takeoff. In response, the pixel image data could be updated with first pixel data representative of a runway highlighter to highlight the presumed runway on the map. In further response to receiving the first entry data, an auto-route generation algorithm could be employed to determine a preliminary taxi clearance. Then, the pixel image data could be updated with second pixel data representative of one or more taxiway highlighters to highlight each preliminary taxiway of the preliminary taxi clearance, cross/hold short indicators, or both If the actual taxi clearance differs from the preliminary taxi clearance generated by the auto-route algorithm, changes may be made. If the assigned runway is different from the presumed runway, the TPG may receive second entry data corresponding to the assigned runway and update the pixel image data accordingly. If an assigned taxiway(s) stated in the actual taxi clearance is different from a preliminary taxiway(s), the TPG may receive third entry data corresponding to each assigned taxiway and update the pixel image data accordingly. If an actual cross/hold short assignment(s) is different from a preliminary cross/hold short assignment(s), the TPG may receive fourth entry data corresponding to the actual cross/hold short assignment(s) and update the pixel image data accordingly.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
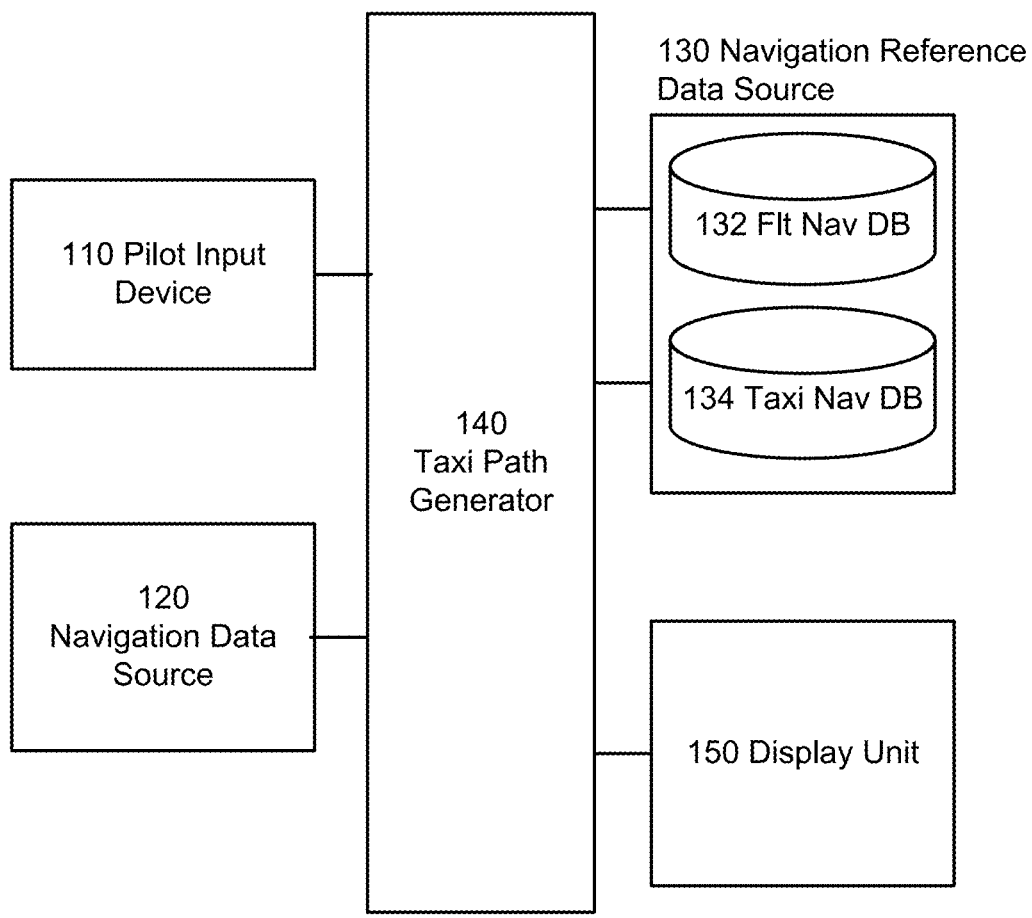
FIG. 1 depicts a block diagram of an electronic taxi clearance recording system.

FIG. 1 depicts a block diagram of an electronic taxi clearance recording system 100 suitable for implementation of the techniques described herein. The electronic taxi clearance recording system 100 of an embodiment of FIG. 1 includes a pilot input device 110, a navigation data source 120, a navigation reference data source 130, a taxi path generator ("TPG") 140, and a display unit 150.

In an embodiment of FIG. 1, the pilot input device 110 could comprise any source for facilitating a pilot's interaction with graphical user interfaces ("GUI") referred to as interactive widgets that are displayed on the surface of a local display unit 150 (some non-interactive widgets could also be displayed). The pilot input device 110 may include any device that allows for the manual selection of a widgets and/or entry of data. Such devices could include, but are not limited to, a tactile device (e.g., keyboard, control display unit, cursor control device, stylus, electronic grease pen, handheld device, touch screen device, notebook, tablet, electronic flight bag, etc. . . . ) and/or speech recognition systems. The pilot input device 110 could be integrated with the display unit 150 if it is configured to receive pilot input (e.g., handheld device, touch screen device, notebook, tablet, etc. . . . ). It should be noted that, although the discussion herein is drawn to the term "pilot," the definition of such term should not be limited to flight personnel but should include ground personnel and/or any viewer of the display unit 150. As embodied herein, the pilot input device 110 may provide input representative of a pilot's selection to a TPG 140.

In an embodiment of FIG. 1, the navigation data source 120 comprises the system or systems that could provide navigation data information in an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

The navigation data source 120 may include, but is not limited to, an air/data system, an attitude heading reference system, an inertial guidance system (or inertial reference system), a radio navigation system, and a global navigation satellite system (or satellite navigation system), all of which are known to those skilled in the art. As embodied herein, the navigation data source 120 could provide navigation data including, but not limited to, ownship position. As embodied herein, the pilot input device 110 (e.g., handheld device, notebook, tablet, etc. . . . ) could be integrated with the navigation data source 120 (e.g., global navigation satellite system) to receive position information and/or configured to receive position information through a wired data bus and/or wireless network from the navigation data source 120 installed in an aircraft. As embodied herein, navigation data may be provided to the TPG 140 for subsequent processing as discussed herein.

In an embodiment of FIG. 1, the navigation reference data source 130 could comprise any source of airport surface data including, but is not limited to, a flight navigation database 132, a taxi navigation database 134, and/or other aircraft systems 136.

The flight navigation database 132 may contain records which provide runway data. The flight navigation database 132 could contain navigation reference data representative of information associated with, but not limited to, airport and airport surfaces including runways and taxiways. As embodied herein, the FMS 120 could employ the flight navigation database 132.

The taxi navigation database 134, such as one described by Krenz et al in U.S. Pat. No. 7,974,773, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 134 could comprise an aerodrome mapping database ("AMDB") as described in the following document published by RTCA, Incorporated: RTCA DO-272A entitled "User Requirements for Aerodrome Mapping Information." RTCA DO-272A provides for aerodrome surface mapping requirements for aeronautical uses particularly on-board aircraft. It should be noted that any standards are subject to change. Those skilled in the art appreciate that standards in the aviation industry including, but not limited to, RTCA DO-272A may be subject to change with future amendments or revisions and/or that other standards related to the subject matter may be adopted. The embodiments disclosed herein are flexible enough to include such future changes and/or adoptions of aviation standards. As embodied herein, the navigation reference data source 130 could provide runway data to the TPG 140 for subsequent processing as discussed herein.

In an embodiment of FIG. 1, the TPG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The TPG 140 may be driven by the execution of software or computer instruction code containing algorithms developed for the specific functions embodied herein. The TPG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the TPG 140 could be a processor(s) used by or in conjunction with any other system of the aircraft including, but not limited to, the pilot input device 110, the navigation data source 120, the navigation reference data source 130, and the display unit 150, or any combination thereof.

The TPG 140 may be programmed or configured to receive as input data representative of information obtained from various systems and/or sources including, but not limited to, the pilot input device 110, the navigation data source 120, and the navigation reference data source 130. As embodied herein, the terms "programmed" and "configured" are synonymous. The TPG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus or through a wireless network. The TPG 140 may be programmed or configured to execute one or both of the methods discussed in detail below. The TPG 140 may be programmed or configured to provide output data to various systems and/or units including, but not limited to, the display unit 150.

In an embodiment of FIG. 1, the display unit 150 could comprise any unit which presents symbolic information related to airport surfaces. The display unit could be installed permanently in ownship and/or a portable device (e.g., handheld device, notebook, tablet, etc. . . . ). In one embodiment herein, the display unit 150 could be configured to display an airport surface moving map ("ASMM"). The ASMM may depict ownship position on an airport surface, where ownship may be considered the aircraft in which the display unit is installed. Ownship position may be determined from data provided by the navigation data source 120, and airport surfaces may be determined and/or formed from data provided by the navigation reference data source 130, where data retrieved from the navigation reference data source 130 may be retrieved automatically based upon the ownship position data. The amount of airport surface information displayed could depend upon a range selected by the pilot, where such range could depend on the amount of information with which he or she wants to be presented. As embodied herein, the ASMM may be used in conjunction with one or more aircraft systems such as an ADS-B system and a TIS-B system to enhance the situational awareness of other traffic on the ground by presenting the position of other traffic on the ASMM in relation to ownship. As stated above, the display unit 150 could be integrated with the pilot input device 110 that is configured to receive pilot input (e.g., handheld device, touch screen device, notebook, tablet, etc. . . . ).

Figure 2:
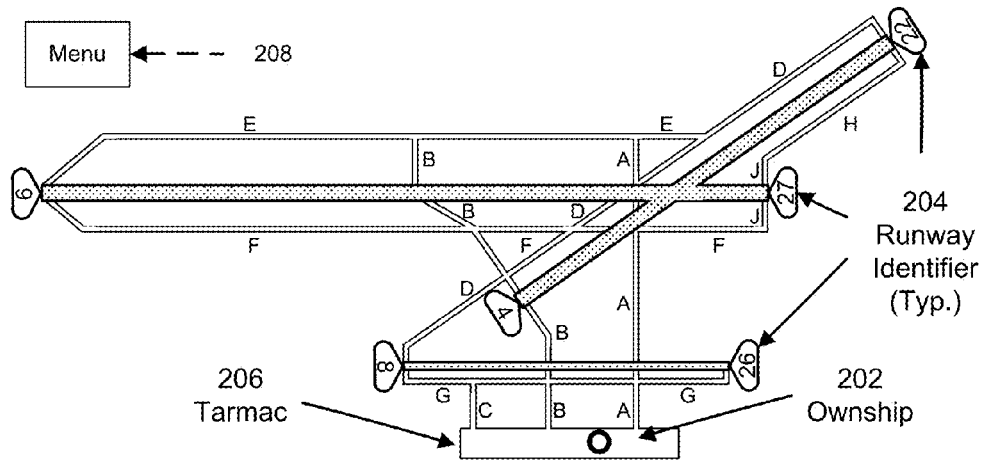
FIG. 2 depicts an exemplary illustration of an Airport Surface Moving Map ("ASMM").

The illustration shown in FIG. 2 depicts an ASMM for providing an exemplary illustration of ownship and airport surfaces that may be depicted on the display unit 150. FIG. 2 depicts the position of ownship 202 in relation to taxiways and runways, where the runways have been identified by a directional runway identifier 204 as the following: RWY 4/22, RWY 9/27, and RWY 8/26. The directional runway identifiers 204 could be employed to identify each runway. As embodied herein, data representative of such directional runway identifiers 204 could be provided by the navigation reference data source 130. As depicted in FIG. 2 and the drawings of FIG. 3, each directional runway identifier may be comprised of a closed shape containing runway identifier information. The closed shape may comprise an oval in which one of the long sides has been replaced with a pointer, where the direction of such pointer indicates the direction of the runway corresponding to the closed shape. Directional runway identifiers were disclosed by Barber et al in U.S. Pat. No. 8,396,616 entitled "System, Module, and Method for Presenting Surface Symbology on an Aircraft Display Unit" (collectively, "Barber") which is incorporated by reference in its entirety.

For the purpose of illustration and not limitation, ownship 202 symbology is depicted as a circle in FIG. 2; those skilled in the art know that the symbology for depicting ownship 202 may be configurable by a manufacturer and/or end-user. From the information depicted in FIG. 2, ownship 202 is located on tarmac 206. Also, the pilot has tapped "MENU" (item 208) from which he or she may access "TAXI ROUTE" page on which the taxi clearance may be entered. For the purpose of illustration in the discussion that follows, tapping will be indicated as a dashed line as shown in FIG. 2.

The advantages and benefits of the embodiments discussed herein may be illustrated in the drawings of FIG. 3 by showing a mode in which a taxi clearance may be recorded electronically on "TAXI ROUTE" page (item 210) of an ASMM through a series of surface selections (e.g., taps). This electronic recording will be presented graphically and textually under taxi route 212, where the textual presentation could aid the pilot during a read-back of the clearance. The locations of the menu 208 and the taxi route on the page are configurable and not limited to the upper left and lower left of the airport surfaces, respectively. In this example, ownship 202 is ready to taxi for take-off from the tarmac 206 and will receive the following taxi clearance: "Runway 22, taxi via Alpha, Foxtrot, Juliet, Hotel, cross Runway 26, hold short of Runway 27."

Figure 3A:
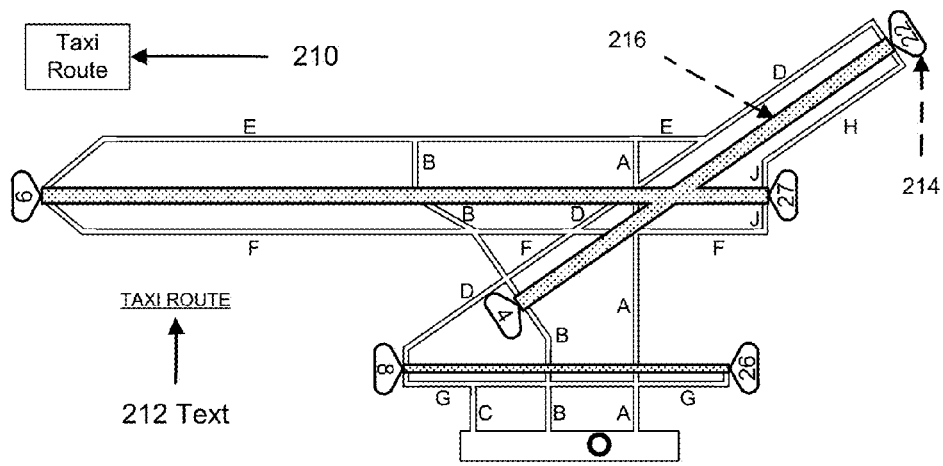
FIG. 3A illustrates a first step of a first sequence for electronically recording of a taxi clearance on an ASMM.

When "Runway 22" is provided to begin the clearance, the pilot may select this runway by tapping on, for example, the directional runway identifier for Runway 22 (item 214) as shown in FIG. 3A. It should be noted that, although the following discussion will be drawn to selections made through finger tapping, other finger gestures could be used and/or speech recognition systems could be used to select the runway and taxiway(s) specified in the taxi clearance; an example of other finger gestures could include a single finger gesture that traces along the runway and/or taxiway could result with such surface(s) being selected. The embodiments disclosed herein are provided for the purpose of illustration and not limitation.

Figure 3B:
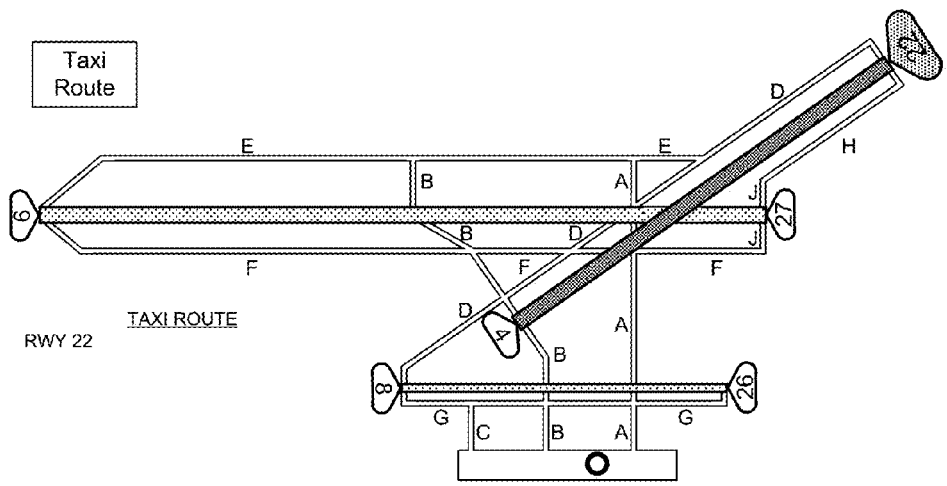
FIG. 3B illustrates a second step of the first sequence for electronically recording of a taxi clearance on an ASMM.

In one configuration of the ASMM, the runway surface and/or the directional runway identifier may be made conspicuous by highlighting the selection with different colors, where the color of the directional runway identifier for the assigned runway is different from the other runways. As shown in FIG. 3B, the Runway 22 directional identifier has been enhanced by a highlighter and made larger, and the runway surface has been enhanced by a highlighter. In addition, text corresponding to the runway selection could be included as shown by "RWY 22" in FIG. 3B. In this configuration, if the surface of runway is tapped (item 216), the pilot's selection may be refused (i.e., not accepted) and/or the pilot could be alerted visually and/or aurally that such a selection is not permissible because two runways share the same surface.

In another configuration of the ASMM in which the tapping of an intersection of un-highlighted surfaces is permissible, the runway may be selected by tapping on the runway surface (item 216); however, because two runways share the same surface, tapping on the surface could result in the selection of Runway 4/22. In such a configuration, further information would be necessary so that the correct runway has been identified. Since the taxiway clearance has not ended, the selection of the surface could be made conspicuous (e.g., shown in a different color or with intermittent flashing) to indicate to the pilot that further information is necessary. In addition, text corresponding to the intersection selection "RWY 4/22" could be added, where such text could be made conspicuous until further information has been provided. Although the remainder of the discussion will be not drawn to the tapping of un-highlighted surfaces forming an intersection, any embodiment in which the tapping of intersecting surfaces is permissible could be made conspicuous until further information has been provided.

Figure 3C:
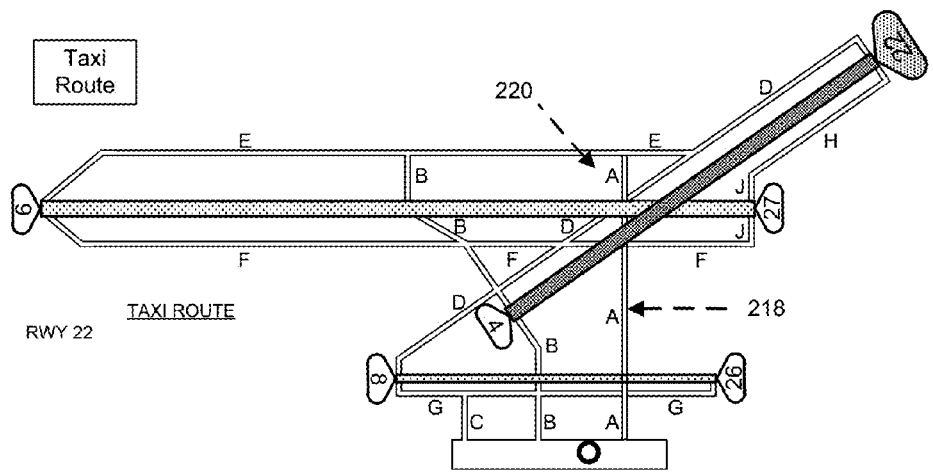
FIG. 3C illustrates a third step of the first sequence for electronically recording of a taxi clearance on an ASMM.
Figure 3D:
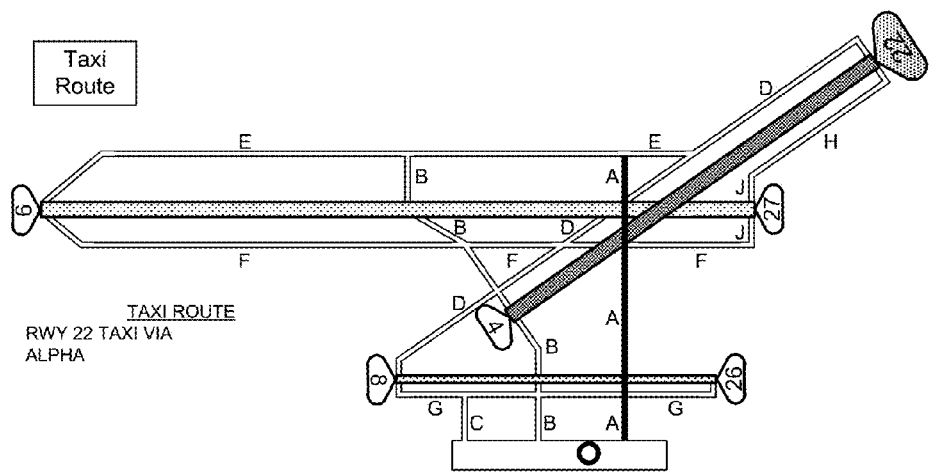
FIG. 3D illustrates a fourth step of the first sequence for electronically recording of a taxi clearance on an ASMM.

As the clearance continues and "Alpha" has been provided in sequence, the pilot may select this taxiway by tapping on, for example, the surface of Taxiway A (item 218) as shown in FIG. 3C. If configured as such, the pilot may select Taxiway A by tapping on a taxiway indicator comprised of an interactive "A" (item 220). Because of the selection, Taxiway A has been highlighted as shown in FIG. 3D. Because it is possible for ownship 202 taxi to Runway 22 from Taxiway A via Taxiways E and D, the entire Taxiway A has been highlighted. Furthermore, the point of Taxiway A closest to ownship 202 (here, the intersection of the tarmac 206 and Taxiway A) acts as the originating point for both the clearance and Taxiway A, and the intersection of Taxiways A and E acts as a terminating point. In addition, text corresponding to the taxiway selection could be included as shown by "TAXI VIA ALPHA" in FIG. 3D. As discussed above, if an intersection of two un-highlighted surfaces is tapped (e.g., the intersection of Taxiway A with another taxiway), the pilot's selection may be refused and/or the pilot could be alerted. Alternatively, a "pop up" box containing a list of surfaces could be generated from which the pilot may make a selection from the plurality of surfaces.

Figure 3E:
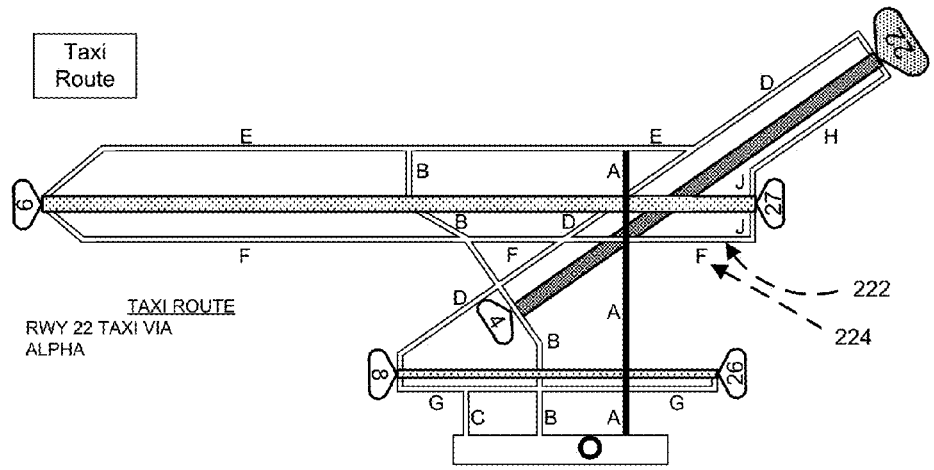
FIG. 3E illustrates a fifth step of the first sequence for electronically recording of a taxi clearance on an ASMM.
Figure 3F:
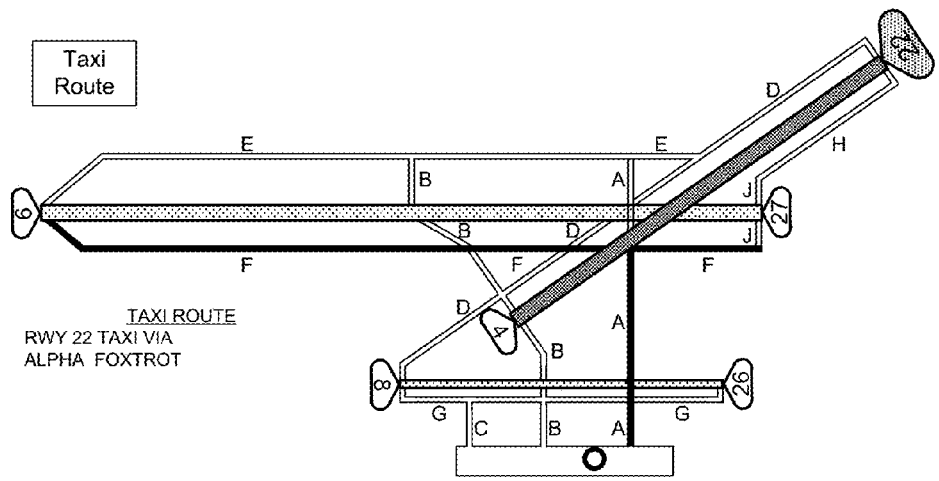
FIG. 3F illustrates a sixth step of the first sequence for electronically recording of a taxi clearance on an ASMM.

As the clearance continues and "Foxtrot" has been provided in sequence, the pilot may select this taxiway by tapping on, for example, the surface of Taxiway F (item 222) as shown in FIG. 3E. If configured as such, the pilot may select Taxiway F by tapping on a taxiway indicator comprised of an interactive "F" (item 224). Because of the selection, Taxiway F has been highlighted as shown in FIG. 3F. Because it is possible for ownship 202 to taxi to Runway 22 from Taxiways F via Taxiways E and D and crossing over Runway 9, the entire Taxiway A has been highlighted. Furthermore, the intersection of Taxiways F and A acts as a terminating point for Taxiway A and the originating point for Taxiway F as the clearance continues; as such, the highlighted portion of Taxiway A beyond Taxiway F has been removed. In addition, text corresponding to the taxiway selection could be included as shown by "FOXTROT" in FIG. 3F. As discussed above, if an intersection of two un-highlighted surfaces is tapped, the pilot's selection may be refused and/or the pilot could be alerted.

Figure 3G:
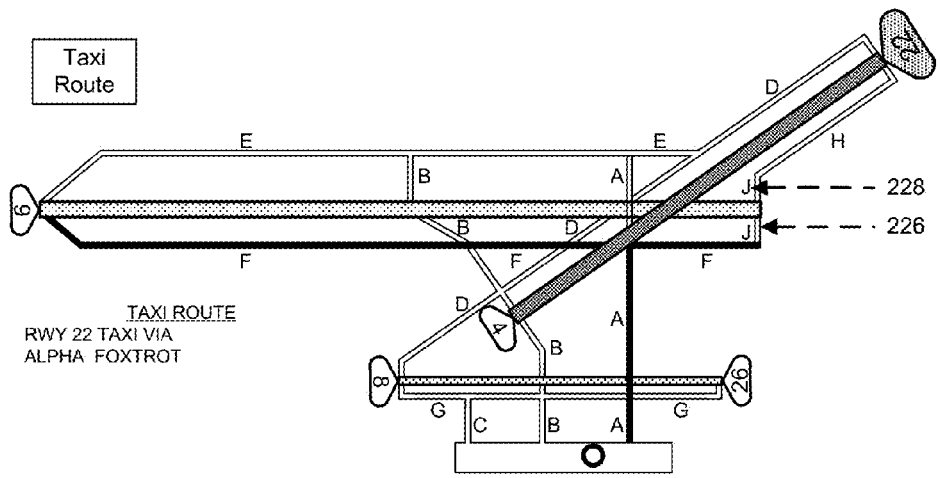
FIG. 3G illustrates a seventh step of the first sequence for electronically recording of a taxi clearance on an ASMM.
Figure 3H:
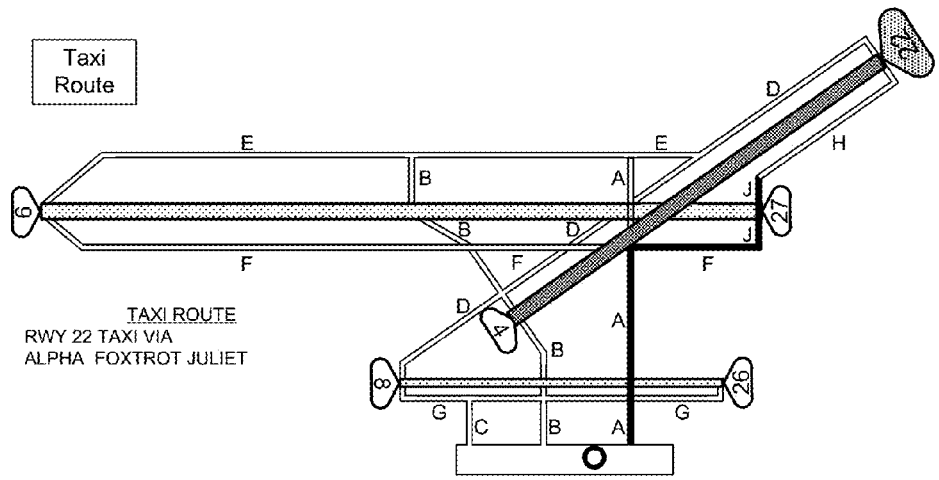
FIG. 3H illustrates an eighth step of the first sequence for electronically recording of a taxi clearance on an ASMM.

As the clearance continues and "Juliet" has been provided in sequence, the pilot may select this taxiway by tapping on, for example, the surface of Taxiway J (item 226) as shown in FIG. 3G (the runway identifier for Runway 27 has been intentionally removed in FIG. 3G for the purpose of discussion only). If configured as such, the pilot may select Taxiway J by tapping on a taxiway indicator comprised of an interactive "J" (item 228). Because of the selection, Taxiway J has been highlighted as shown in FIG. 3H. Furthermore, intersection of Taxiways J and F acts as a terminating point for Taxiway F. As such, only the portion of Taxiway F in between its originating and terminating points has been highlighted. In addition, text corresponding to the taxiway selection could be included as shown by "JULIET" in FIG. 3H. As discussed above, if an intersection of two un-highlighted surfaces is tapped, the pilot's selection may be refused and/or the pilot could be alerted.

Figure 3I:
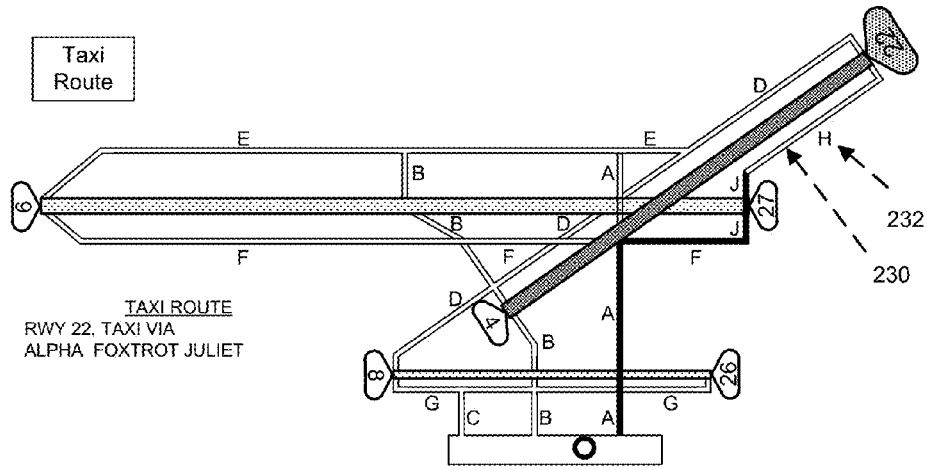
FIG. 3I illustrates a ninth step of the first sequence for electronically recording of a taxi clearance on an ASMM.
Figure 3J:
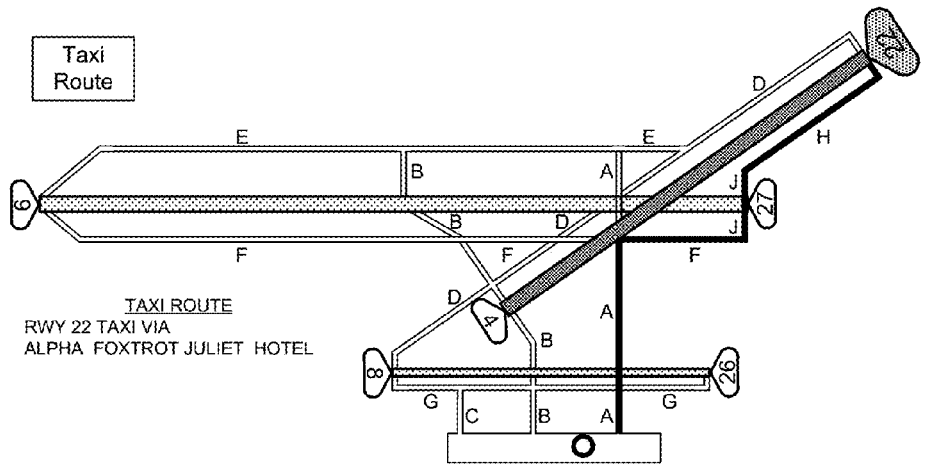
FIG. 3J illustrates a tenth step of the first sequence for electronically recording of a taxi clearance on an ASMM.

As the clearance continues and "Hotel" has been provided in sequence, the pilot may select this taxiway by tapping on, for example, the surface of Taxiway H (item 230) as shown in FIG. 3I. If configured as such, the pilot may select Taxiway H by tapping on a taxiway indicator comprised of an interactive "H" (item 232). Because of the selection, Taxiway H has been highlighted as shown in FIG. 3J. Furthermore, intersection of Taxiway J and H acts as a terminating point for Taxiway J. As such, only the portion of Taxiway J in between its originating and terminating points has been highlighted (which happens to be the entire length of Taxiway J in this example). In addition, text corresponding to the taxiway selection could be included as shown by "HOTEL" in FIG. 3J. As discussed above, if an intersection of two un-highlighted surfaces is tapped, the pilot's selection may be refused and/or the pilot could be alerted.

Figure 3K:
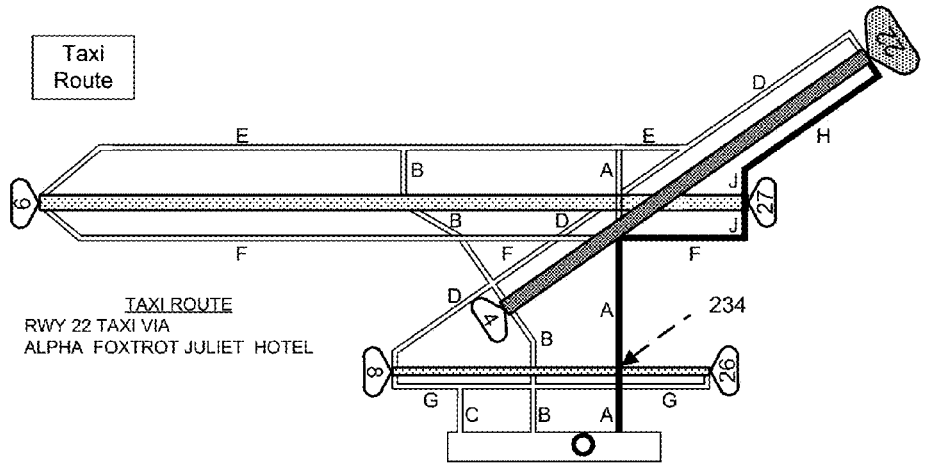
FIG. 3K illustrates an eleventh step of the first sequence for electronically recording of a taxi clearance on an ASMM.

As the clearance continues and "cross Runway 26" has been provided in sequence, the pilot may select the intersection of a highlighted taxiway with the runway as shown in FIG. 3K (item 234). In the embodiment in which the selection of an intersection of two un-highlighted surfaces is not permissible, the selection of an intersection comprised of a highlighted surface may be permissible. Here, tapping the intersection of a highlighted taxiway with a runway could result with the presentation of a "cross/hold short" indicator 236 comprised of a graphical object (e.g., two parallel lines) enclosed by a visible closed shape (e.g., rectangle) as shown in FIG. 3L; also, text corresponding to this position of "HOLD SHORT RWY 26" has been presented.

Figure 3L:
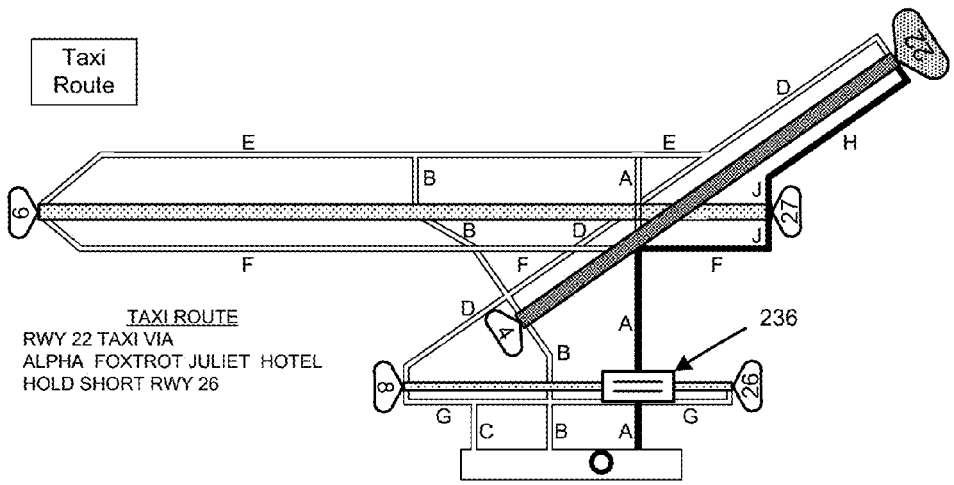
FIG. 3L illustrates a twelfth step of the first sequence for electronically recording of a taxi clearance on an ASMM.
Figure 3M:
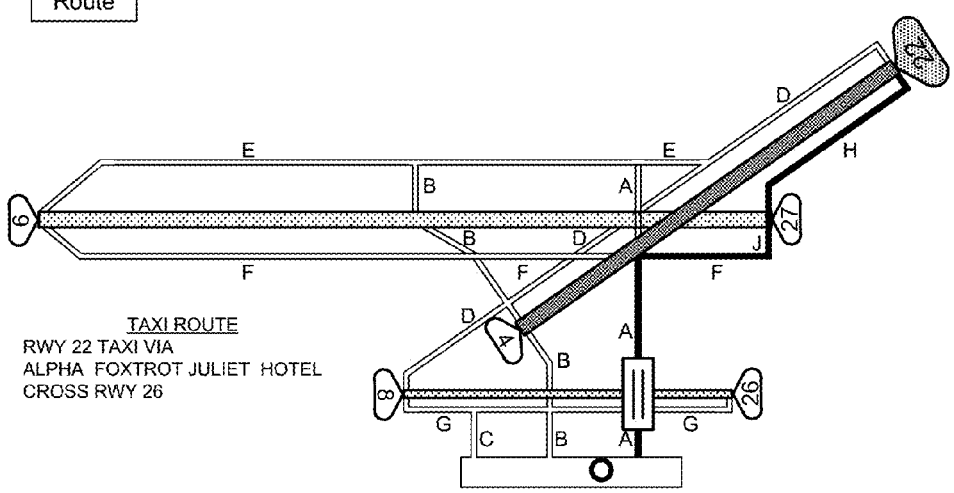
FIG. 3M illustrates a thirteenth step of the first sequence for electronically recording of a taxi clearance on an ASMM.

As shown in FIG. 3L, the cross/hold short indicator 236 is presented in the "hold short" position in which the two parallel lines of the graphical object are parallel with the runway. For the purpose of this example, the default presentation of the cross/hold short indicator 236 and corresponding text has been configured to display the hold short position and corresponding hold short text. Because a "cross Runway 26" clearance has been issued, the pilot may tap the cross/hold short indicator 236 to switch the position of it to the "cross" position and change the text to "CROSS RWY 26" as shown in FIG. 3M. It should be noted that other finger gestures could be used to switch the position of the indicator such as, but not limited to, a double finger swipe, where such double finger swipe could be made perpendicular to the runway when the clearance specifies a cross over command or parallel if a hold short is specified.

Figure 3N:
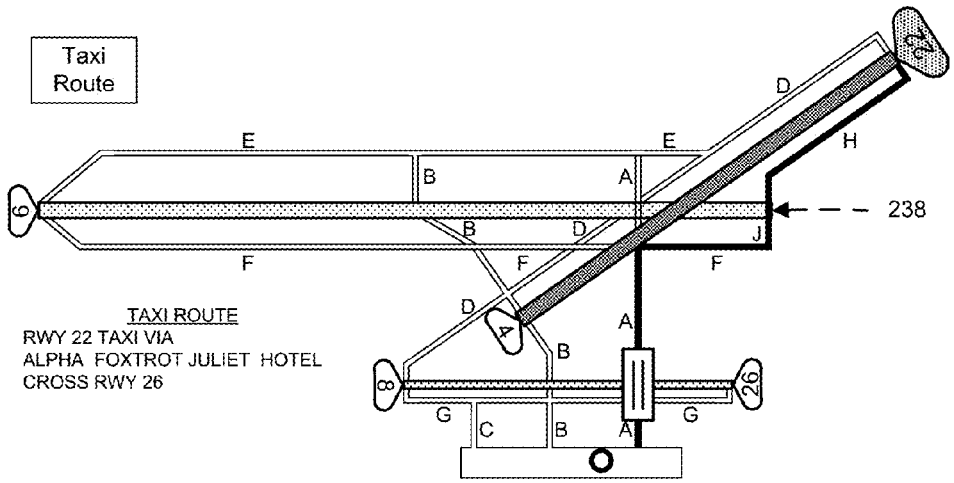
FIG. 3N illustrates a fourteenth step of the first sequence for electronically recording of a taxi clearance on an ASMM.
Figure 3O:
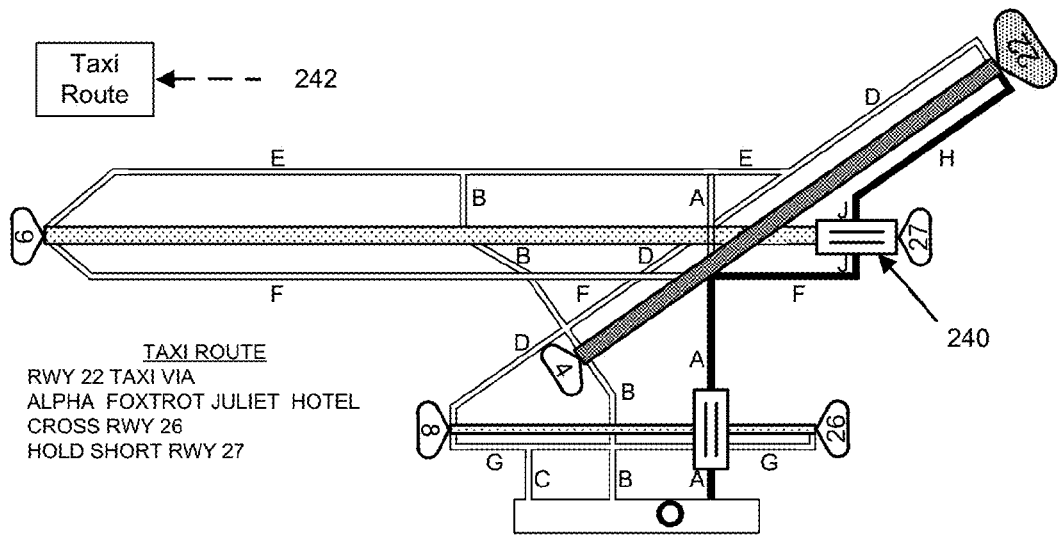
FIG. 3O illustrates a fifteenth step of the first sequence for electronically recording of a taxi clearance on an ASMM.
Figure 3P:
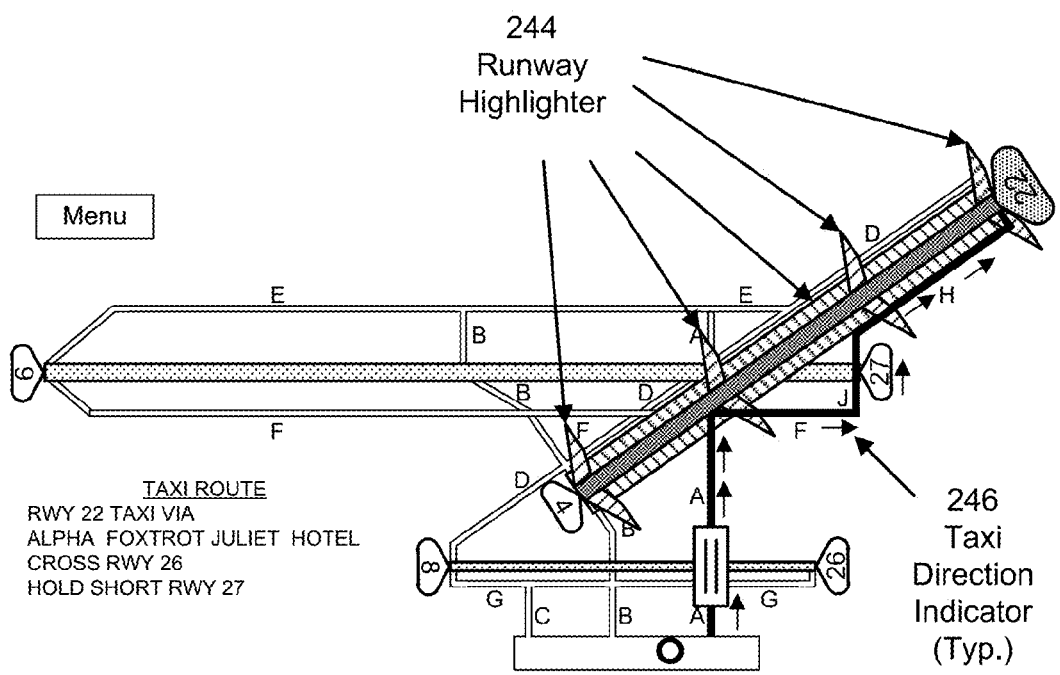
FIG. 3P illustrates a sixteenth step of the first sequence for electronically recording of a taxi clearance on an ASMM.

As the clearance continues and "hold short of Runway 27" has been provided in sequence, the pilot may select the intersection of a highlighted taxiway with the runway as shown in FIG. 3N (item 238). The selection of a highlighted taxiway with Runway 27 has resulted with the presentation of the cross/hold short indicator 240 as shown in FIG. 3O; also, text corresponding to this position of "HOLD SHORT RWY 27" has been presented. Because the default presentation of the cross/hold short indicator 240 has been configured for the hold short position, the pilot does not have to tap it.

Because the end of the clearance has been reached, the pilot may tap "TAXI ROUTE" (item 242) to complete the entry of the clearance (which could be accomplished after his or her read-back of the clearance). After the entry of the taxi clearance has been completed, a runway highlighter 244 could be presented to depict the assigned take-off runway and/or taxi direction indicators 246 could be presented to indicate to the direction of the taxi. Alternatively, the runway highlighter 244 and/or taxi direction indicators 246 could be presented after the assigned runway has been selected. The runway highlighter 244 was disclosed in Barber. As depicted with cross-hatching fill in the drawings of FIG. 3P, the runway highlighter 244 may be comprised of a plurality of runway edge highlighters and/or plurality of chevrons which point in the direction of the assigned runway. The taxi direction indicator 246 could appear as a series of small arrows appears adjacent to or on the surface of each taxiway. Although not shown, the taxi direction indicator 246 may be comprised of taxiway edge highlighters and/or plurality of chevrons similar to the runway highlighter 244 in a smaller scale which point in the direction of the taxi. The runway highlighter 244 could be made conspicuous or enhanced by color and/or intermittent flashing, where the configuration of such color and/or flashing could depend on the location of ownship in relation to the assigned runway.

The advantages and benefits of the embodiments discussed herein may be further illustrated in the drawings of FIG. 4 by showing an example of a mode in which a taxi clearance may be recorded electronically on "TAXI ROUTE" page (item 210) of an ASMM through an advanced gesturing technique referred to herein as "rubberbanding." As in the previous example, ownship 202 is ready to taxi for take-off from the tarmac 206 and will receive the following taxi clearance: "Runway 22, taxi via Alpha, Foxtrot, Juliet, Hotel, cross Runway 26, hold short of Runway 27."

Figure 4A:
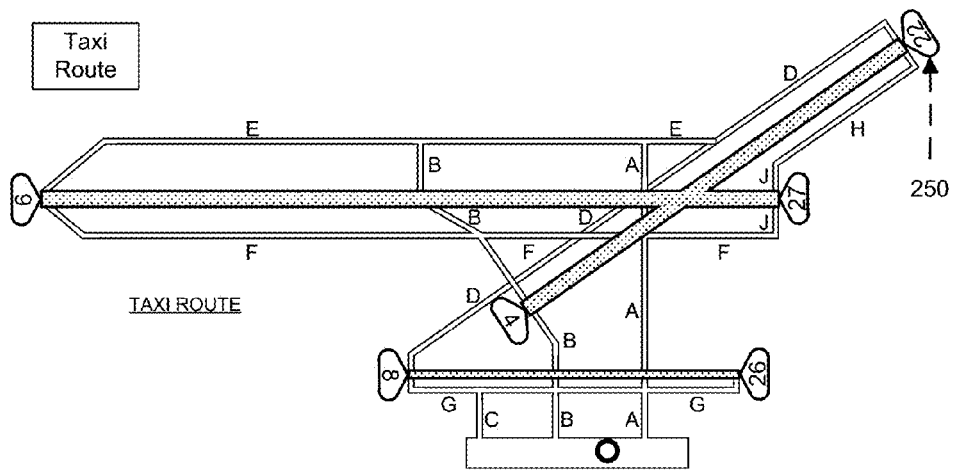
FIG. 4A illustrates a first step of a second sequence for electronically recording of a taxi clearance on an ASMM which employs a "rubberbanding" technique to enter the taxi clearance.
Figure 4B:
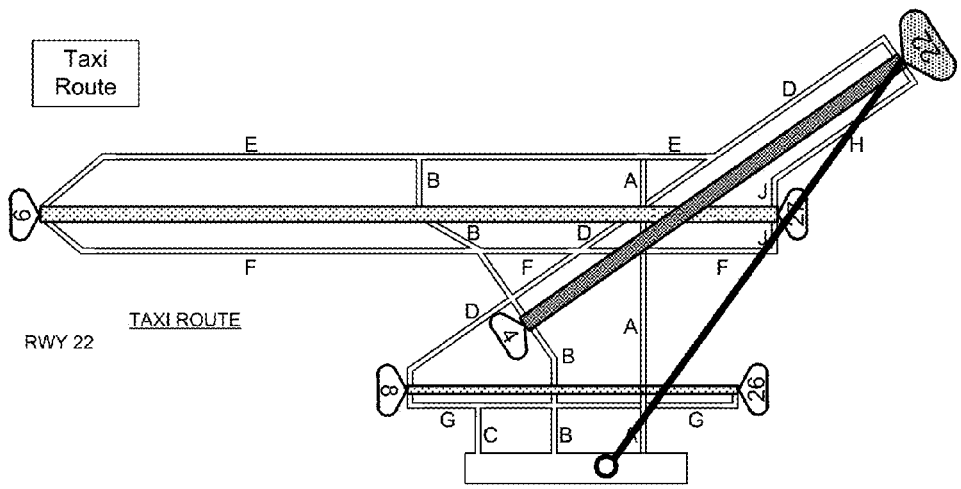
FIG. 4B illustrates a second step of the second sequence for electronically recording of a taxi clearance on an ASMM.

When "Runway 22" is provided to begin the clearance, the pilot may initiate the recording of the clearance by tapping on, for example, the directional runway identifier for Runway 22 (item 250) as shown in FIG. 4A. As shown in FIG. 4B, the Runway 22 directional identifier has been enhanced by a highlighter and made larger, the runway surface has been enhanced by a highlighter, and a stretchable line connecting ownship with Runway 22 has been added. Instead of tapping on the directional runway identifier, the pilot may initiate an alternative recording of the clearance by dragging his or her finger from ownship to the directional runway identifier, through which time the stretchable line is created as its length increases as the pilot's finger moves from ownship to the directional runway identifier. Along with the display of the stretchable line, text corresponding to the runway selection could be included as shown by "RWY 22" in FIG. 4B.

Figure 4C:
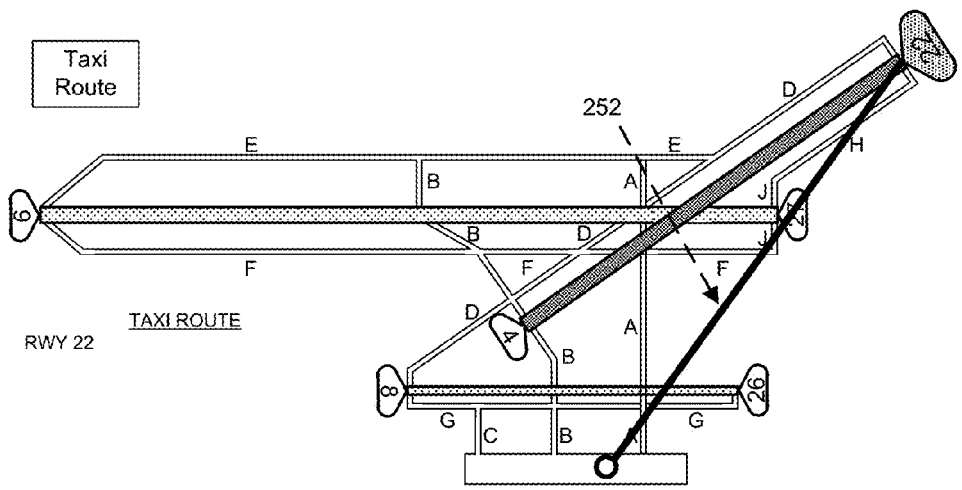
FIG. 4C illustrates a third step of the second sequence for electronically recording of a taxi clearance on an ASMM.
Figure 4D:
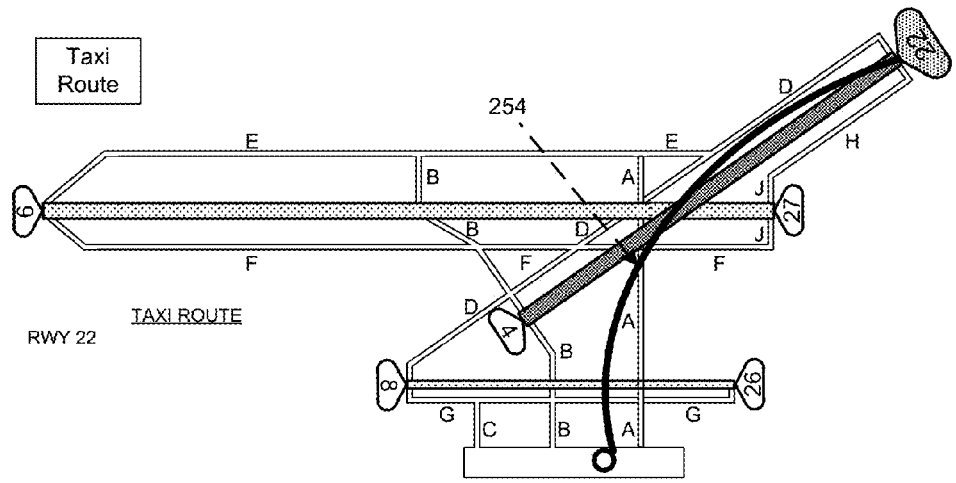
FIG. 4D illustrates a fourth step of the second sequence for electronically recording of a taxi clearance on an ASMM.
Figure 4E:
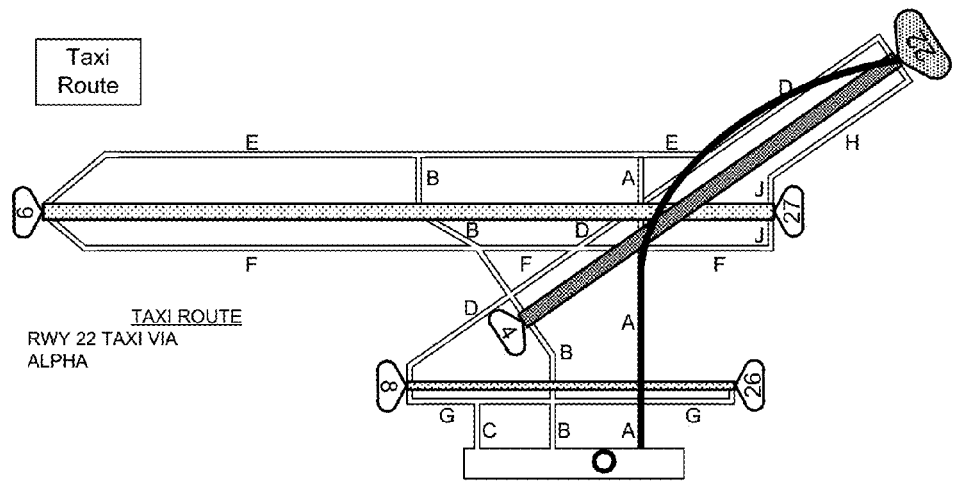
FIG. 4E illustrates a fifth step of the second sequence for electronically recording of a taxi clearance on an ASMM.

As the clearance continues and "Alpha" has been provided in sequence, the pilot may "grab" (i.e., select) the stretchable line by placing his or her finger on the screen as shown in FIG. 4C (item 252). Then, without lifting his or her finger, the stretchable line may be dragged to the surface of Taxiway A as shown as shown in FIG. 4D (item 254) and/or taxiway indicator while being anchored at ownship and the directional runway identifier. Then, the pilot's finger is lifted, part of the stretchable line can "snap" into place by changing into a straight line at the point where the pilot's finger is lifted as shown in FIG. 4E; this point replaces ownship as an anchor point for the stretchable line. Alternatively, the straight line could be the entire length of Taxiway A as shown in FIG. 3D. Although the discussion related to rubberbanding will be drawn to a point where the finger is lifted, the new anchor point is not limited to such point. Along with the snapping action, text corresponding to the taxiway selection could be included as shown by "ALPHA" in FIG. 4E.

Figure 4F:
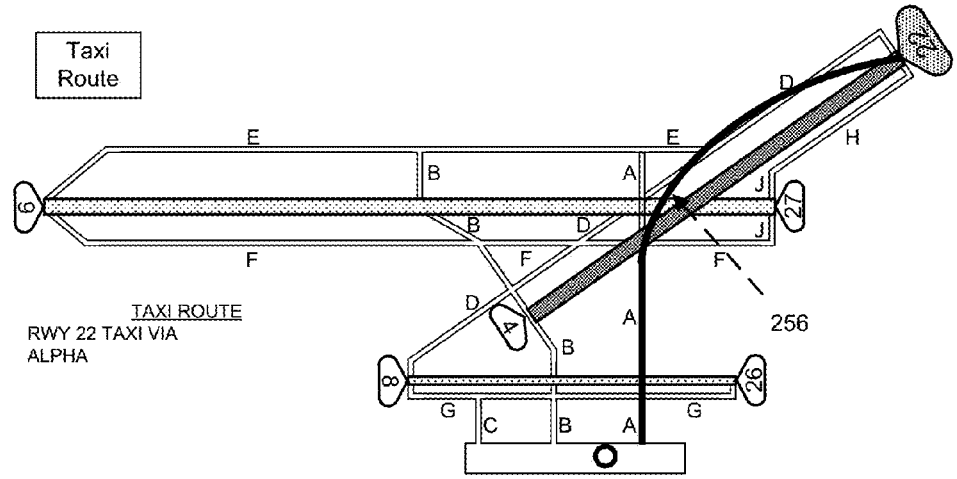
FIG. 4F illustrates a sixth step of the second sequence for electronically recording of a taxi clearance on an ASMM.
Figure 4G:
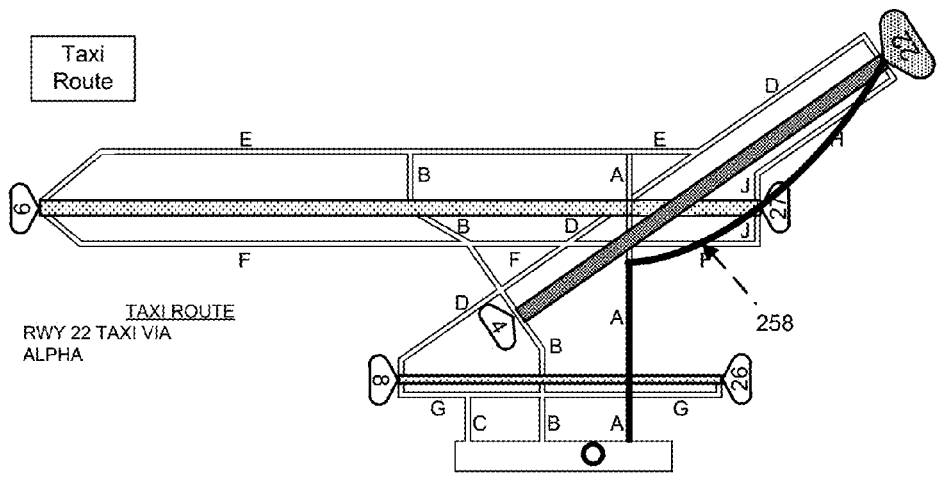
FIG. 4G illustrates a seventh step of the second sequence for electronically recording of a taxi clearance on an ASMM.
Figure 4H:
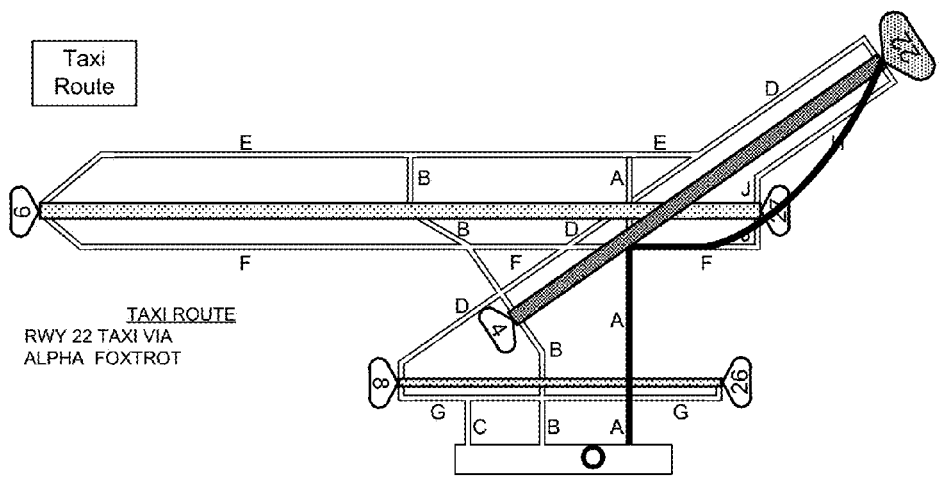
FIG. 4H illustrates an eighth step of the second sequence for electronically recording of a taxi clearance on an ASMM.

As the clearance continues and "Foxtrot" has been provided in sequence, the pilot may grab the stretchable line as shown in FIG. 4F (item 256) and drag it to the surface of Taxiway F as shown as shown in FIG. 4G (item 258). When the pilot's finger is lifted, part of the stretchable line snaps into place as a straight line as shown in FIG. 4H; this point replaces ownship as an anchor point for the stretchable line.

Figure 4I:
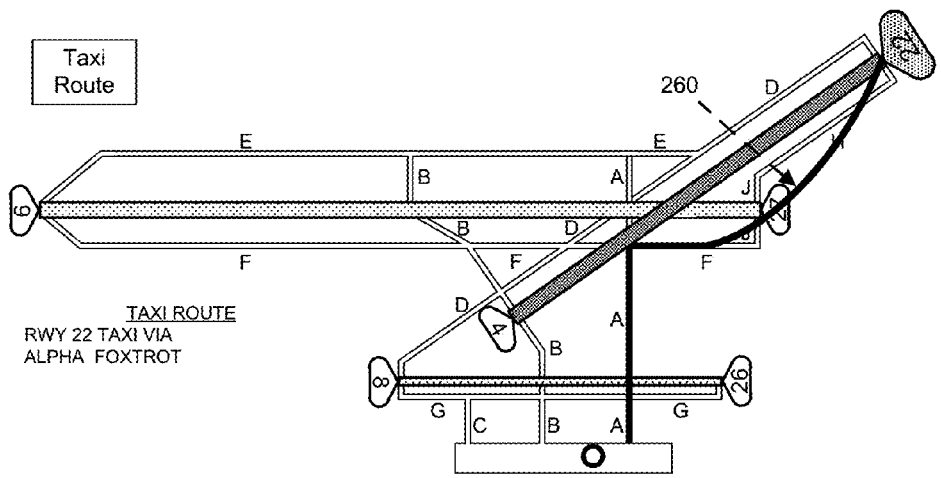
FIG. 4I illustrates a ninth step of the second sequence for electronically recording of a taxi clearance on an ASMM.
Figure 4J:
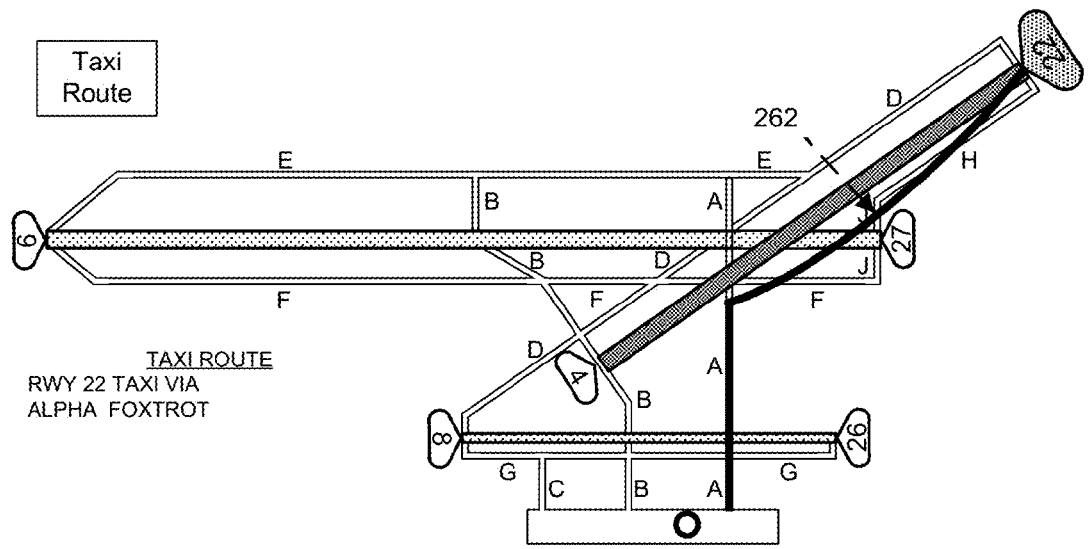
FIG. 4J illustrates a tenth step of the second sequence for electronically recording of a taxi clearance on an ASMM.
Figure 4K:
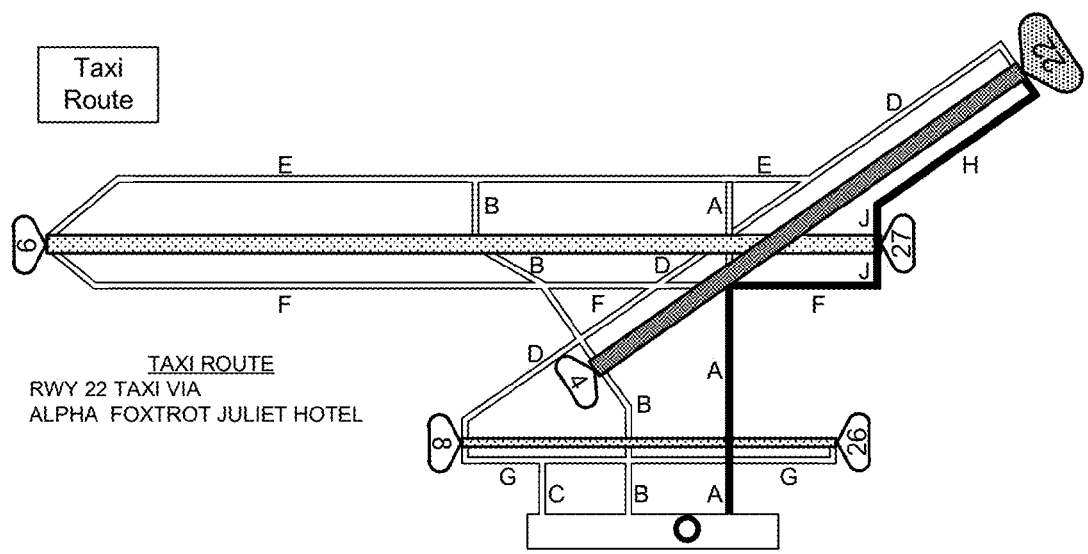
FIG. 4K illustrates an eleventh step of the second sequence for electronically recording of a taxi clearance on an ASMM.

As the clearance continues and "Juliet" has been provided in sequence, the pilot may grab the stretchable line as shown in FIG. 4I (item 260) and drag it to the surface of Taxiway J as shown as shown in FIG. 4J (item 262). When the pilot's finger is lifted, the remaining stretchable line has snapped into place as two straight lines as shown in FIG. 4K. Here, the TPG 140 could be programmed with an auto-fill function which completed the recording of the route because there was only one taxiway surface remaining between Taxiway F and Runway 22.

As the clearance continues and "cross Runway 26" has been provided in sequence along with the remainder of the clearance, the pilot may continue recording of the clearance with the sequence of actions discussed above related to FIGS. 3K through 3O, inclusive.

The advantages and benefits of the embodiments discussed herein may be further illustrated in the drawings of FIG. 5 by showing an example of a mode in which a preliminary taxi clearance may be automatically generated and changed as the clearance is received on "TAXI ROUTE" page of an ASMM. As in the previous examples, ownship 202 is ready to taxi for take-off from the tarmac 206 and will receive the following taxi clearance: "Runway 22, taxi via Alpha, Foxtrot, Juliet, Hotel, cross Runway 26, hold short of Runway 27."

Figure 5A:
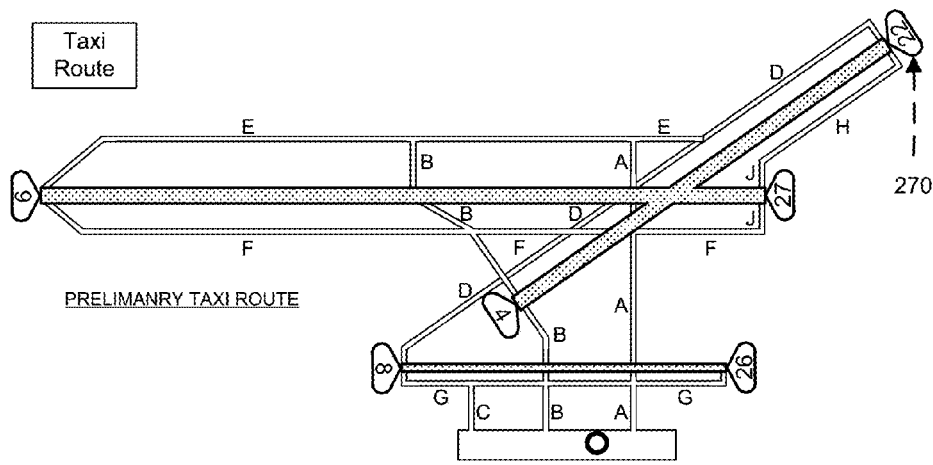
FIG. 5A illustrates a first step of a third sequence for electronically recording of a taxi clearance on an ASMM which employs an auto-route generator.
Figure 5B:
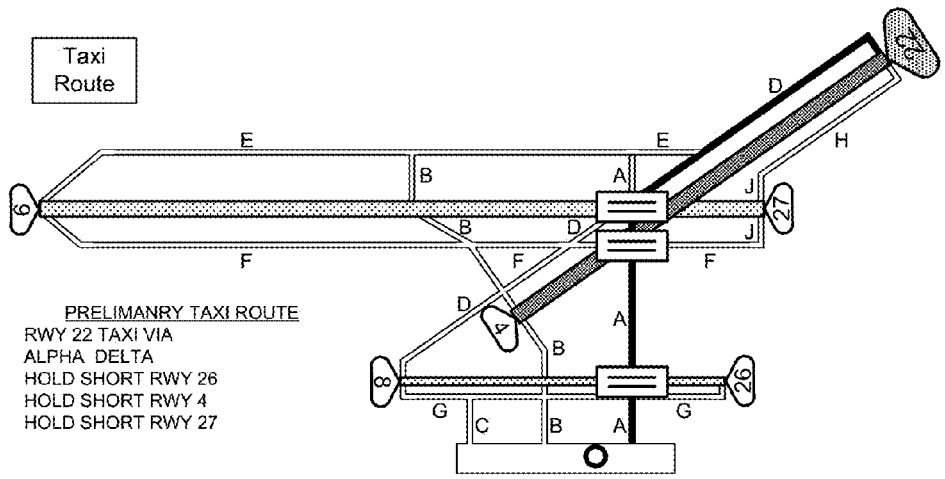
FIG. 5B illustrates a second step of the third sequence for electronically recording of a taxi clearance on an ASMM.

Prior to receiving the taxi clearance, the pilot may learn that "Runway 22" is the active runway for take-off. Then, the pilot may initiate the recording of the preliminary clearance by tapping on, for example, the directional runway identifier for Runway 22 (item 270) as shown in FIG. 4A. As shown in FIG. 5B, the Runway 22 directional identifier have been enhanced by a highlighter and made larger, the runway surface has been enhanced by a highlighter, and surfaces in between ownship and the selected runway have been highlighted, where the surfaces have been identified through the use of a route generating algorithm, where such algorithm may be known to those skilled in the art. Here, the route generating algorithm has identified Taxiways A and D for the preliminary clearance. As part of the algorithm, taxi route intersections with runways have been identified in the generation of the preliminary clearance, causing three "cross/hold short" indicators to be placed in a default "hold short" position for the three runways that will be crossed. In addition, text corresponding to the preliminary clearance has been presented.

As embodied herein, the route generating algorithm could preclude the use of a surface in its generation of the preliminary taxi clearance if data corresponding to the surface indicates its unavailability. For example, if data corresponding to Taxiway D indicates that it is closed, then Taxiway D may be precluded from use, and hence, not be included in the preliminary clearance.

When the pilot is ready to receive the taxi clearance, he or she may follow along with the clearance by looking at the ASMM as the clearance is received. If any changes to the automatically generated preliminary taxi clearance are necessary, the pilot may make them as the clearance is received. When "Runway 22" is provided to begin the clearance, the pilot may look at the ASMM and verify that Runway 22 has been highlighted. As the clearance continues and "Alpha" has been provided in sequence, the pilot may look at the ASMM and verify that Taxiway A has been highlighted.

Figure 5C:
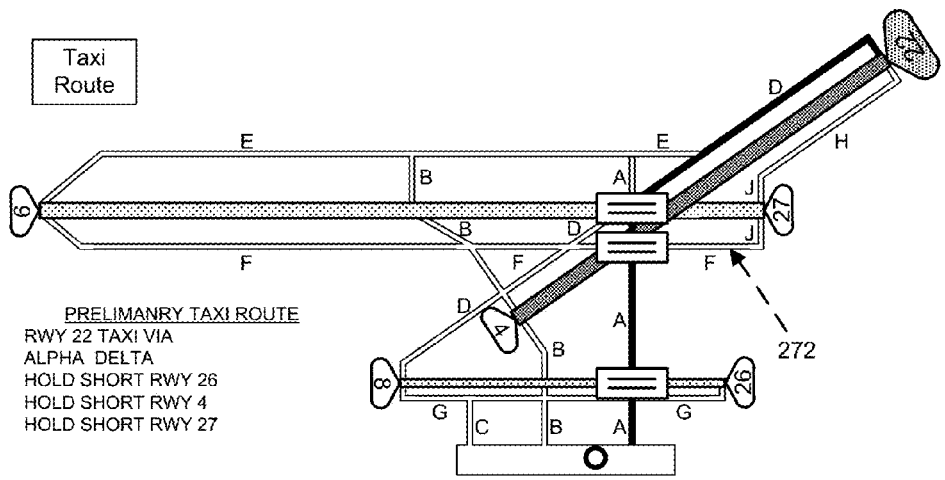
FIG. 5C illustrates a third step of the third sequence for electronically recording of a taxi clearance on an ASMM.
Figure 5D:
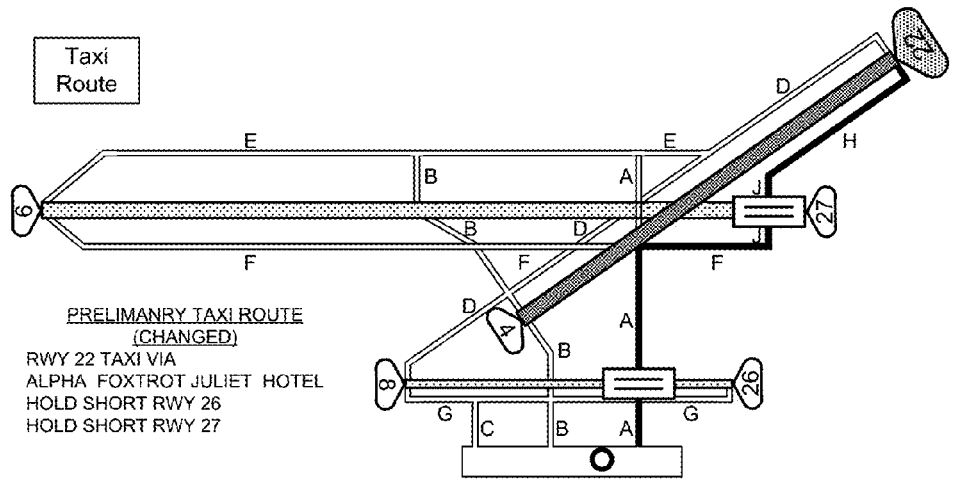
FIG. 5D illustrates a fourth step of the third sequence for electronically recording of a taxi clearance on an ASMM.
Figure 5E:
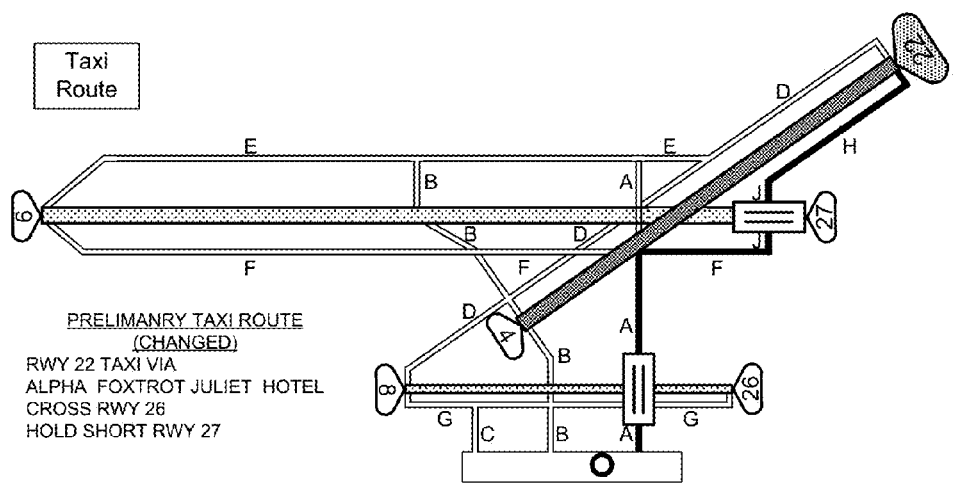
FIG. 5E illustrates a fifth step of the third sequence for electronically recording of a taxi clearance on an ASMM.
Figure 5F:
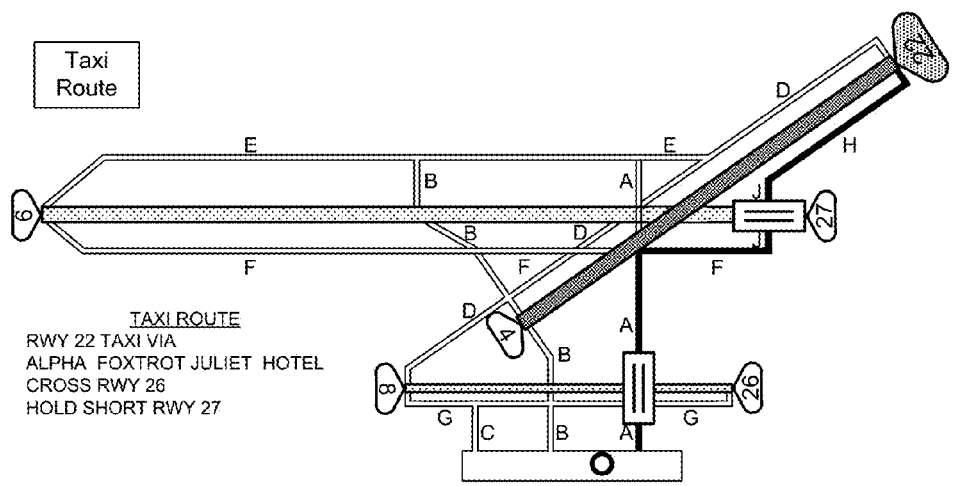
FIG. 5F illustrates a sixth step of the third sequence for electronically recording of a taxi clearance on an ASMM.

As the clearance continues and "Foxtrot" has been provided in sequence, the pilot may look at the ASMM and verify that Taxiway F has not been highlighted. Because Taxiway F is next in sequence after Taxiway A, the pilot may select this taxiway by tapping on, for example, the surface of Taxiway F (item 272) as shown in FIG. 5C. When this action is applied to the route generating algorithm, the surfaces in between Taxiway A and Runway 22 passing through Taxiway F have been identified and highlighted. Here, the route generating algorithm has identified Taxiways F, J, H and D for the preliminary clearance. As part of the algorithm, taxi route intersections with runways have been identified again, causing two "cross/hold short" indicators to be placed in a default "hold short" position for the two runways that will be crossed. In addition, text corresponding to the preliminary clearance has been changed.

As the clearance continues and "Juliet" has been provided in sequence, the pilot may look at the ASMM and verify that Taxiway J has been highlighted. As the clearance continues and "Hotel" has been provided in sequence, the pilot may look at the ASMM and verify that Taxiway H has been highlighted.

As the clearance continues and "cross Runway 26" has been provided in sequence, the pilot may look at the ASMM and verify that the "cross/hold short" indicator on Runway 26 is not placed in the "cross" position. Here, the pilot may change the position of the indicator in the same manner as discussed above. As a result, the map shown in FIG. 5E may be presented.

As the clearance continues and "hold short Runway 27" has been provided in sequence, the pilot may look at the ASMM and verify that the "cross/hold short" indicator on Runway 27 is placed in the "hold short" position. Because the end of the clearance has been reached, the pilot may tap "TAXI ROUTE" to complete the entry of the clearance as discussed above. As a result, the map shown in FIG. 5F may be presented in which the text has changed to indicate that the taxi route display is no longer a preliminary taxi route.

Figure 6:
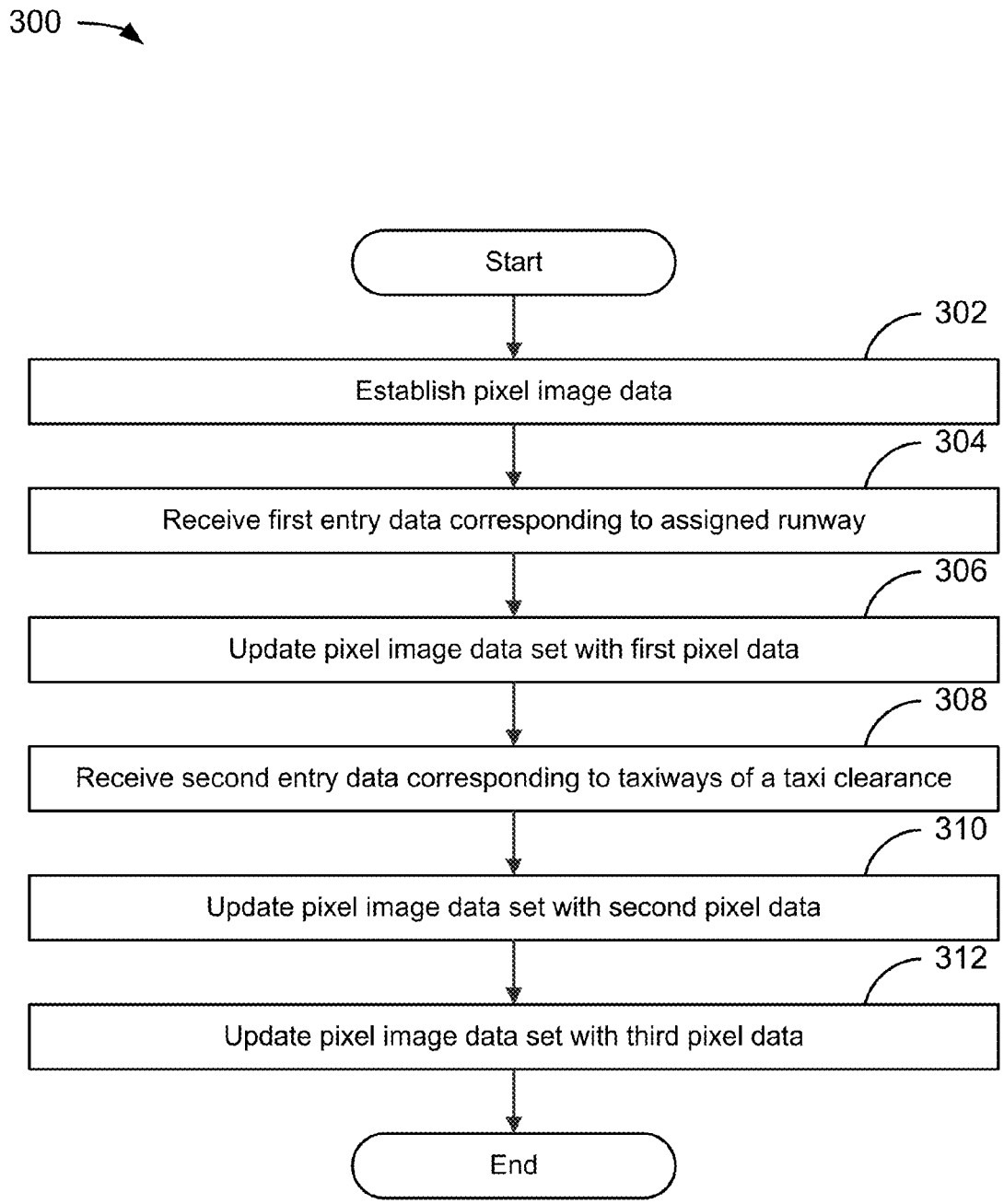
FIG. 6 provides a first flowchart illustrating a first method for electronically recording of a taxi clearance on an ASMM.
Figure 7:
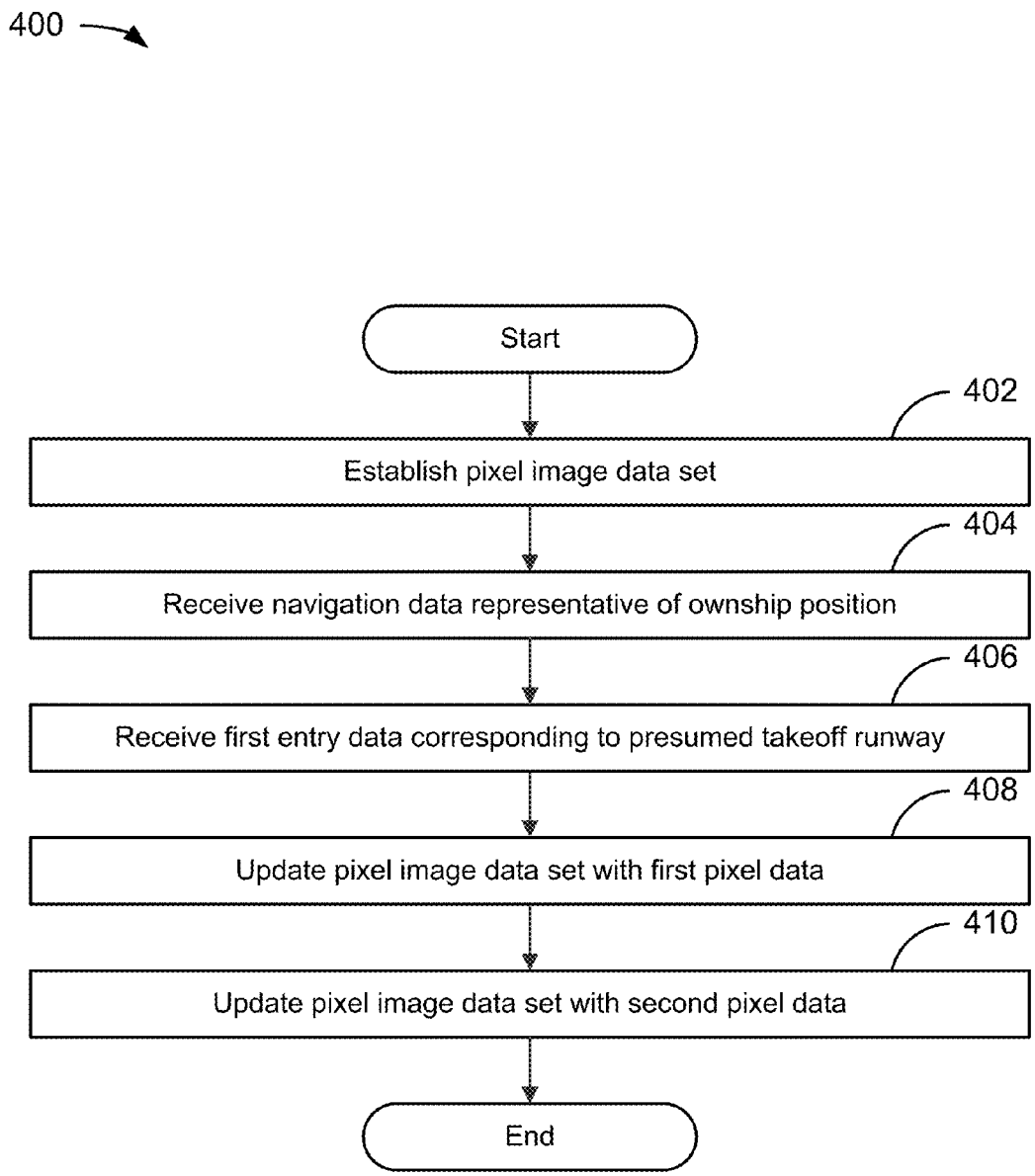
FIG. 7 provides a second flowchart illustrating a second method for electronically recording of a taxi clearance on an ASMM.

FIGS. 6 and 7 depict flowcharts 300 and 400, respectively, providing examples for electronically recording a taxi clearance on an airport surface map presented on a display unit, where the TPG 140 may be programmed or configured with instructions corresponding to the following modules. As embodied herein, the TPG 140 may be a processor of an indicating system comprising one or more display units. Also, the TPG 140 may be a processor of a module such as, but not limited to, a printed circuit card having one or more input interfaces to facilitate data communications with the TPG 140, i.e., the receiving and providing of data. As necessary for the accomplishment of the following modules embodied in FIGS. 6 and 7, the receiving of data is synonymous and/or interchangeable with the retrieval of data, and the providing of data is synonymous and/or interchangeable with the making available or supplying of data.

The method of flowchart 300 begins with module 302 with the establishing of pixel image data that is presented to a display unit configured to receive the pixel image data and present the image represented therein. The pixel image data may be representative of an image of airport surfaces and surface identifiers (e.g., directional surface identifiers) for runway surfaces and/or taxiway surfaces. The image could be formed from surface data retrieved from the navigation reference data source 130. The establishing of pixel image data could include the generating of such pixel image data by techniques known to those skilled in the art. One technique could include the employment of the ARINC 661 protocol to, in part, control the use of widgets representative of airport surfaces and/or surface identifiers through the administration of widget parameters which affect the display of widgets and/or the pilot's ability to interact with the widgets. With ARINC 661, the image of airport surfaces and surface identifiers could be comprised of any combination of interactive and/or non-interactive widgets.

The method continues with module 304 with the receiving of first entry data through the pilot input device 110. The first entry data could represent an entry corresponding to the assigned runway for takeoff that has been specified in a taxi clearance. The entry could be comprised of the selection of a first interactive widget corresponding to a runway identifier (e.g., a directional runway identifier) and/or a runway surface either in whole or in part as discussed above.

If a stretchable line is used, the entry could be comprised of the establishing of a stretchable line, where one end of the stretchable line (i.e., a first end) may be located at the ownship position indicator, the other end (i.e., the second end) at the assigned runway, the first end serves as a first anchor point, and the second end serves as the second anchor point. In one embodiment, a stretchable line could be established by selecting a runway identifier (e.g., a directional runway identifier) and/or a runway surface either in whole or in part as discussed above, where such selection results in a stretchable line being presented in the image between the ownship position indicator and the assigned runway. In another embodiment, a stretchable line could be established by a selecting, dragging, and releasing process. First, the ownship position indicator could be selected (e.g., placing a finger from the touch screen), thereby establishing a first anchor point of a stretchable line. Then, without de-selecting the indicator (e.g., without lifting the finger from the touch screen), a dragging motion away from the indicator causes a stretchable line to form and get longer as the dragging motion proceeds. When the assigned runway is reached, the stretchable line may be released (e.g., the finger is lifted from the touch screen), thereby establishing a second anchor point of the stretchable line.

As discussed and illustrated above, the taxi clearance could be comprised of one runway to which the aircraft is assigned and from which the aircraft is planned to take off. The taxiway clearance could be comprised of one originating taxiway and one terminating taxiway; if only one taxiway is stated in the clearance, the originating taxiway and one terminating taxiway may be the same. If a runway is stated in the taxi clearance and is included as part of the taxi path to the assigned runway, then such a runway may be considered as a taxiway. If two or more taxiways are assigned, they may be assigned in sequence in the order which the aircraft is expected to follow. Each taxiway could have an originating end and a terminating end, and if there is a sequence of taxiways, the terminating end could be the originating end of the next taxiway in sequence. For the originating taxiway, the originating end could be fixed; for the terminating taxiway, the terminating end could be fixed and terminate at the assigned runway.

The method continues with module 306 with the updating of the pixel image data with first pixel data. The first pixel data may be responsive to the first entry data of module 304 above and represent a first highlighter for making the assigned runway appear conspicuous; the first pixel data could also include text corresponding to the assigned runway for a textual presentation of the taxi clearance along with the graphical presentation. The first highlighter could change the appearance of the surface of the assigned runway and/or the runway indicator. Also, the first highlighter could be a runway highlighter comprised of a plurality of chevrons and a plurality of runway edge highlighters. Because the display unit is configured to receive the pixel image data and present the image represented therein, the image may change in response to each entry as the pixel image data is updated.

The method continues with module 308 with the receiving of one or more second entry data through the pilot input device 110. Each second entry data could be representative of an entry corresponding to an assigned taxiway specified in a taxi clearance. The entry could be comprised of the selection of a second interactive widget corresponding to a taxiway identifier and/or a taxiway surface either in whole or in part as discussed above.

When a stretchable line is presented, the entry could be comprised of selecting of the stretchable line in between its first and second anchor points, dragging of the stretchable line to a taxiway specified in the taxi clearance, and releasing the stretchable line when such taxiway is reached. The stretchable line stretches in between its first point and second anchor point as it is being dragged, and when it is released, the first anchor point moves to a location on the taxiway on which the stretchable line is released.

The method continues with module 310 with the updating of the pixel image data with each second pixel data. The second pixel data may be responsive to each second entry data of module 308 above and represent the highlighter for making each assigned taxiway appear conspicuous; the second pixel data could also include text corresponding to each assigned taxiway. The second highlighter could change the appearance of the surface of each taxiway in between its originating end and its terminating end. Also, the second highlighter could change the appearance of the taxiway indicator. Because the display unit is configured to receive the pixel image data and present the image represented therein, the image may change as the pixel image data is updated when each second entry data is received.

The method continues with module 312 with the updating of the pixel image data with third pixel data if one or more assigned taxiways cross one or more runways. The third pixel data may be data representative of at least one cross/hold short indicator to make each runway/taxiway intersection along the taxi path appear conspicuous; the third pixel data could also include text corresponding to each one cross/hold short indicator. Each cross/hold short indicator could appear automatically or be created manually through the pilot input device 110. If appearing automatically, the default position of the indicator could correspond to the hold short position which could require a manual input to change positions as discussed above.

In addition, the method could include the receiving of a fourth data entry representative of the end or completion of the entering of the taxi clearance. In one configuration, the pixel image data could be updated with fourth pixel data responsive to the fourth entry data that is representative of a runway highlighter comprised of a plurality of chevrons and a plurality of runway edge highlighters. Then, the method of flowchart 300 proceeds to the end.

The method of flowchart 400 begins with module 402 with the establishing of pixel image data that is presented to a display unit configured to receive the pixel image data and present the image represented therein. The statements made above with respect to module 302 apply to module 402.

The method of flowchart 400 begins with module 402 with the establishing of pixel image data that is presented to a display unit configured to receive the pixel image data and present the image represented therein.

The method continues with module 404 with the receiving of navigation data from the navigation data source 120. This data may be representative of the position of ownship.

The method continues with module 406 with the receiving of first entry data through the pilot input device 110. The first entry data may be representative of an entry corresponding to a presumed runway for takeoff that the pilot expects to be the assigned runway specified in the taxi clearance.

The method continues with module 408 with the updating of the pixel image data with first pixel data. The first pixel data may be responsive to the first entry data of module 406 above and represent a first highlighter for making the presumed runway appear conspicuous; the first pixel data could also include text corresponding to the presumed runway for a textual presentation of a preliminary taxi clearance along with the graphical presentation.

The method continues with module 410 with the updating of the pixel image data with each second pixel data. The second pixel data may be responsive to the first entry data of module 406 and an auto-route generating algorithm from which the preliminary taxi clearance comprised of the presumed runway and one or more preliminary taxiways is created. The second pixel data could represent a highlighter for making each preliminary taxiway appear conspicuous; the second pixel data could also include text corresponding to each preliminary taxiway.

After the pixel image data has been updated with first pixel data and second pixel data representative of the preliminary taxi clearance, changes to the preliminary taxi clearance may be made when the actual taxi clearance comprised of the assigned runway and assigned taxiway(s) is received. If the assigned runway is different from the presumed runway, second entry data could be received that is representative of the assigned runway. Then, third pixel data could replace the first pixel data in response to the entry of the assigned runway, where the third pixel data may be representative of highlighter highlighting the surface of the assigned runway and/or text if there is a textual presentation. If one or more of assigned taxiways are different from the preliminary taxiways, third entry data could be received that is representative of the assigned taxiway(s). Then, fourth pixel data could replace the second pixel data in response to the entry of the assigned taxiway(s), where the fourth pixel data may be representative of highlighter highlighting the surface(s) of the assigned taxiway(s) and/or text if there is a textual presentation.

Additionally, the pixel image data could be updated with fifth pixel data if one or more preliminary taxiways cross one or more runways. The fifth pixel data may be responsive to the first entry data of module 406 and the auto-route generating algorithm from which the preliminary taxi clearance is created. The fifth pixel data may be data representative of at least one cross/hold short assignment specified in the preliminary taxi clearance to make each runway/taxiway intersection along the preliminary taxi path appear conspicuous; the fifth pixel data could also include text corresponding to each cross/hold short indicator. Each cross/hold short indicator could appear automatically, where the default position of the indicator could correspond to the hold short position. The fifth pixel data could be replaced with sixth pixel data if one or more cross/hold short assignments specified in the preliminary taxi clearance differ from the actual taxi clearance; this replacement could be made in response to fourth entry data received through the pilot input device 110.

Alternatively, the pixel image data could be updated with seventh pixel data if cross/hold short assignments are not created after the auto-route generating algorithm is performed. The seventh pixel data may be data representative of at least one cross/hold short assignment specified in the actual taxi clearance to make each runway/taxiway intersection along the actual taxi path appear conspicuous; the seventh pixel data could also include text corresponding to each cross/hold short indicator. The updating of the pixel image data with the seventh pixel data could be made in response to fifth entry data received through the pilot input device 110 after the cross/hold short assignment(s) have been assigned in the actual taxi clearance. Then, the method of flowchart 400 proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A device for displaying an electronically recorded taxi clearance, said device comprising:
a display unit configured to:
    receive pixel image data representative of an image of a plurality of surfaces and ownship position indicator provided by a taxi path generator configured to:
       establish the pixel image data;
       receive first entry data representative of a selection of a destination surface of the plurality of surfaces through a pilot input device; and
       update the pixel image data with first pixel data in response to the first entry data being received, where the first pixel data is representative of an image of a stretchable line comprised of a first anchor point and a second anchor point, where
          the first anchor point is established on a surface indicated by the ownship position indicator, and
          the second anchor point is established at the destination surface; and
    present the image to a viewer.

2. The device of claim 1, wherein
the display unit is comprised of a touch screen interface, such that
    the first entry data is received via the touch screen interface.

3. The device of claim 1, wherein
the selection of the destination surface is a selection of a first widget corresponding to
    a runway identifier,
    a runway surface either in whole or in part, or
    both the runway identifier and the runway surface either in whole or in part.

4. The device of claim 1, wherein
the first entry data is further representative of
    a selection of the ownship position indicator to establish the first anchor point of the stretchable line,
    a dragging of the stretchable line from the first anchor point, and a releasing of the stretchable line to establish a second anchor point of the stretchable, where
the selection of a destination surface is made upon the release of the stretchable line.

5. The device of claim 1, wherein
the taxi path generator is further configured to:
update the pixel image data with second pixel data representative of
a first highlighter highlighting the destination surface, first text corresponding to the destination surface, or both.

6. The device of claim 5, wherein the destination surface is an assigned destination surface specified in an actual taxi clearance.

7. The device of claim 6, wherein
the actual taxi clearance further specifies at least one surface of the plurality of surfaces, where
one surface is an originating surface,
one surface is a terminating surface,
each surface has an originating end and a terminating end,
the originating end of the originating surface is fixed,
the terminating end of the terminating surface is fixed and terminates at the assigned surface,
the terminating end of each surface, except for the terminating surface, is not fixed but dependent upon the next surface in a sequence of at least two surfaces specified in the actual taxi clearance, and
the originating end of each surface, except for the originating surface, is not fixed but dependent upon the preceding surface in a sequence of at least two surfaces specified in the actual taxi clearance.

8. The device of claim 7, wherein the originating surface and the terminating surface are the same surface.

9. The method of claim 7, wherein
the taxi path generator is further configured to:
receive second entry data representative of at least one entry corresponding to a surface specified in the actual taxi clearance other than the assigned destination surface; and
update the pixel image data with third pixel data in response to the second entry data being received, where the third pixel data is representative of
a second surface highlighter corresponding to each surface specified in the actual taxi clearance other than the assigned destination surface,
second text corresponding to each surface specified in the actual taxi clearance other than the assigned destination surface, or
both.

10. The method of claim 9, wherein the third pixel data is further representative of at least one cross/hold short indicator if at least one surface specified in the actual taxi clearance crosses over a runway.

11. The method of claim 9, wherein
the taxi path generator is further configured to:
receive third entry data representative of at least one cross/hold short assignment specified in the actual taxi clearance; and
update the pixel image data with fourth pixel data in response to the third entry data being received, where the fourth pixel data is representative of
a cross/hold short indicator corresponding to each cross/hold short assignment specified in the actual taxi clearance,
third text corresponding to each cross/hold short assignment specified in the actual taxi clearance, or both.

12. A method for electronically recording a taxi clearance on a display unit, said method comprising:
establishing pixel image data representative of an image of a plurality of surfaces and ownship position indicator;
receiving first entry data representative of a selection of a destination surface of the plurality of surfaces through a pilot input device; and
updating the pixel image data with first pixel data in response to the first entry data being received, where
the first pixel data is representative of an image of a stretchable line comprised of a first anchor point and a second anchor point, where
the first anchor point is established on a surface indicated by the ownship position indicator, and
the second anchor point is established at the destination surface.

13. The method of claim 12, wherein
the first entry data is further representative of
a selection of the ownship position indicator to establish the first anchor point of the stretchable line,
a dragging of the stretchable line from the first anchor point, and
a releasing of the stretchable line to establish a second anchor point of the stretchable, where
the selection of a destination surface is made upon the release of the stretchable line.

14. The method of claim 12, further comprising:
updating the pixel image data with second pixel data representative of
a first highlighter highlighting the destination surface,
first text corresponding to the destination surface, or both.

15. The method of claim 14, wherein the destination surface is an assigned destination surface specified in an actual taxi clearance.

16. The method of claim 15, wherein
the actual taxi clearance further specifies at least one surface of the plurality of surfaces, where
one surface is an originating surface,
one surface is a terminating surface,
each surface has an originating end and a terminating end,
the originating end of the originating surface is fixed,
the terminating end of the terminating surface is fixed and terminates at the assigned surface,
the terminating end of each surface, except for the terminating surface, is not fixed but dependent upon the next surface in a sequence of at least two surfaces specified in the actual taxi clearance, and
the originating end of each surface, except for the originating surface, is not fixed but dependent upon the preceding surface in a sequence of at least two surfaces specified in the actual taxi clearance.

17. The method of claim 16, wherein the originating surface and the terminating surface are the same surface.

18. The method of claim 16, further comprising:
receiving second entry data representative of at least one entry corresponding to a surface specified in the actual taxi clearance other than the assigned destination surface; and
updating the pixel image data with third pixel data in response to the second entry data being received, where
the third pixel data is representative of
a second surface highlighter corresponding to each surface specified in the actual taxi clearance other than the assigned destination surface second text corresponding to each surface specified in the actual taxi clearance other than the assigned destination surface, or both.

19. The method of claim 18, wherein the third pixel data is further representative of at least one cross/hold short indicator if at least one surface specified in the actual taxi clearance crosses over a runway.

20. The method of claim 18, further comprising:

receiving third entry data representative of at least one cross/hold short assignment specified in the actual taxi clearance; and updating the pixel image data with fourth pixel data in response to the third entry data being received, where the fourth pixel data is representative of a cross/hold short indicator corresponding to each cross/hold short assignment specified in the actual taxi clearance, third text corresponding to each cross/hold short assignment specified in the actual taxi clearance, or both.

\* \* \* \* \*